(12) United States Patent
Overholser et al.

(10) Patent No.: US 11,216,802 B2
(45) Date of Patent: Jan. 4, 2022

(54) SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS

(71) Applicant: tZERO IP, LLC, New York, NY (US)

(72) Inventors: Scott Overholser, Salt Lake City, UT (US); Robert Christensen, Sandy, UT (US); Nicole Sanders, Cottonwood Heights, UT (US); Justin Wilson, Draper, UT (US); Robert Valmassoi, New York, NY (US); Chase Lester, West Jordan, UT (US); Michael William Stuart Smith, Provo, UT (US)

(73) Assignee: tZERO IP, LLC, New York, NY (US)

( * ) Notice: Subject to any disclaimer, the term of this patent is extended or adjusted under 35 U.S.C. 154(b) by 47 days.

(21) Appl. No.: 16/536,940

(22) Filed: Aug. 9, 2019

(65) Prior Publication Data
US 2020/0051067 A1 Feb. 13, 2020

Related U.S. Application Data

(60) Provisional application No. 62/881,121, filed on Jul. 31, 2019, provisional application No. 62/715,543, (Continued)

(51) Int. Cl.
*G06Q 20/36* (2012.01)
*H04L 29/06* (2006.01)
(Continued)

(52) U.S. Cl.
CPC ....... *G06Q 20/367* (2013.01); *G06F 16/1834* (2019.01); *G06Q 20/0658* (2013.01);
(Continued)

(58) Field of Classification Search
CPC ............ G06Q 20/367; G06Q 20/0658; G06Q 20/389; G06Q 20/3672; G06Q 20/405;
(Continued)

(56) References Cited

U.S. PATENT DOCUMENTS 9,819,670 B2   11/2017  Bhat et al.
2017/0011460 A1*  1/2017  Molinari ............... G06F 21/645
(Continued)

FOREIGN PATENT DOCUMENTS

JP    2018521437 A    8/2018
WO   2017145019 A1   8/2017

OTHER PUBLICATIONS

Regulation A—Conditional Small Issues Exemption, from the electronic code of Federal Regulations, sections 230.251 through 230.263, 22 pages, Apr. 20, 2015 (Year: 2015).*

(Continued)

*Primary Examiner* — James D Nigh
(74) *Attorney, Agent, or Firm* — Fogg & Powers LLC

(57) ABSTRACT

A network node that includes at least one processor, at least one memory, and at least one network interface is disclosed. The network node is part of a peer-to-peer network of network nodes implementing a distributed ledger. The network node is communicatively coupled to at least one remotely located computing device through the at least one network interface. The at least one processor is configured to receive, from a remotely located computing device, a request to transfer a security token. The at least one processor is also configured to execute a plurality of compliance rules associated with the security token. At least one of the compliance rules is implemented using at least one smart contract. The at least one smart contract references a global (Continued)

registry. The at least one processor is also configured to transfer the security token based on the execution of the compliance rules.

19 Claims, 7 Drawing Sheets

Related U.S. Application Data filed on Jul. 8, 2019, provisional application No. 62/717,575, filed on Aug. 10, 2018.

(51) Int. Cl.
| | |
|---|---|
| *H04L 9/32* | (2006.01) |
| *G06Q 20/06* | (2012.01) |
| *G06Q 20/38* | (2012.01) |
| *G06F 16/182* | (2019.01) |
| *G06Q 20/40* | (2012.01) |

(52) U.S. Cl.
CPC ....... *G06Q 20/3672* (2013.01); *G06Q 20/389* (2013.01); *G06Q 20/405* (2013.01); *H04L 9/3236* (2013.01); *H04L 63/20* (2013.01); *G06Q 2220/00* (2013.01); *H04L 2209/38* (2013.01); *H04L 2209/56* (2013.01)

(58) Field of Classification Search
CPC ............. G06Q 20/065; G06Q 20/3678; G06Q 2220/00; H04L 63/20; H04L 63/12; H04L 9/3236; H04L 9/3239; H04L 2209/56; H04L 2209/38; H04L 2463/102
USPC .......................................................... 705/65
See application file for complete search history.

(56) References Cited

U.S. PATENT DOCUMENTS

| | | | |
|---|---|---|---|
| 2017/0223012 A1 | 8/2017 | Xu et al. | |
| 2018/0240107 A1* | 8/2018 | Andrade | G06Q 20/36 |
| 2019/0251629 A1* | 8/2019 | Gordon, III | G06Q 20/3821 |
| 2019/0333051 A1* | 10/2019 | Brogger | G06Q 20/3678 |
| 2019/0349372 A1* | 11/2019 | Smith | H04L 9/3265 |
| 2019/0377724 A1* | 12/2019 | Pennington | G06Q 20/223 |
| 2020/0051072 A1* | 2/2020 | Black | G06Q 20/3224 |
| 2020/0320222 A1* | 10/2020 | Zhou | H04L 9/3247 |

OTHER PUBLICATIONS

Regulation D—Rules Governing the Limited Offer and Sale of Securities Within Registration under the Securities Acto of 1933, sections 230.500 through 230.508, 22 pages, Oct. 9, 2020 (Year: 2020).*
Regulation S—Rules Governing Offers and Sales made outside the United States without Registrations under the Securities Act of 1933, sections 230.901 through 230.905, 16 pages, Dec. 17, 2007 (Year: 2007).*
DTC Chills and Freezes, SEC.gov, 3 pages, May 1, 2012 (Year: 2012).*
International Searching Authority, "International Search Report and Written Opinion from PCT Application No. PCT/US2019/045910", from Foreign Counterpart to U.S. Appl. No. 16/536,940, filed Dec. 5, 2019, pp. 1-13, Published: WO.
Omar et al., "Identity Management in IoT Networks Using Blockchain and Smart Contracts", IEEE Conference on Internet of Things, Green Computing and Communications, Cyber, Physical and Social Computing, Smart Data, Blockchain, Computer and Information Technology, Congress on Cybermatics, Jul. and Aug. 2018, pp. 994-1000, IEEE.
Watkins, "Defining and Verifying Accredited Investors: Effect of Potential SEC Changes on North Carolina's Crowdfunding Statute, the NC PACES Act", Banking and Finance Law Commons, Mar. 1, 2017, pp. 1-33, vol. 21, Issue 1, Article 22, UNC School of Law.
"GAS explosion as NEO not divisible", NEO, 2018 or at least as early as Jun. 13, 2019, pp. 1-4.
"GoChain Development Updates—Upgradable Smart Contracts & Development Insights", GoChain, Dec. 31, 2018, pp. 1-4.
"Introduction to Smart Contracts A Simple Smart Contract", Solidity 0.509 documentation, at least as early as Jun. 17, 2019, pp. 1-11.
"List of All Functions", robin-stocks 1.0.0 documentation, at least as early as Jun. 13, 2019, pp. 1-14.
"Trading Glossary", TradeStation, at least as early as Jun. 13, 2019, pp. 1-29.
Araoz, "Proxy Libraries in Solidity", Zeppelin Blog, Mar. 6, 2017, pp. 1-6.
Augustol, "ERC930—Eternal Storage Standard", ethereum/EIPs, Mar. 14, 2018, pp. 1-7, Issue #930, GitHub.
Bayequentist, "Will the total supply of IOTA tokens ever increase?" Iota Beta, Nov. 30, 2017, pp. 1-3.
Beers, "Understand the What and Why of Stock Splits", Stock Trading Strategy & Education, Apr. 25, 2019, pp. 1-8, Investopedia.
Chawla, "How to write upgradeable contracts in solidity!", Apr. 25, 2018, pp. 1-15.
Editordavid, "Could Blockchain-Based Fractions of Digitized Stocks Revolutionize Markets", Slashdot, Mar. 10, 2019, pp. 1-14.
Eha, "Capital markets foe seeks an end run via blockchain", American Banker, Jan. 5, 2018, pp. 1-9.
Ganti, "Reverse Stock Split", Corporate Finance & Accounting, Apr. 1, 2019, pp. 1-8, Investopedia.
Gucluturk, "The DAO Hack Explained: Unfortunate Take-off of Smart Contracts", at least as early as Jun. 17, 2019, pp. 1-8.
Hamlin, "This Week in Blockfolio Signal", Blockfolio Blog, Apr. 26, 2019, pp. 1-11.
Haris, "Upgradable Smart Contracts Made Easy", Hacker Noon, Oct. 19, 2018, pp. 1-10.
Nadolinski et al., "Proxy Patterns", ZeppelinOS Blog, Apr. 19, 2018, pp. 1-16.
Palladino, "Malicious backdoors in Ethereum Proxies", Nomic Labs, Jun. 1, 2018, pp. 1-8.
Petethomas, "Blockchain startup R3 sues competitor Ripple", Hacker News Sep. 8, 2017, pp. 1-8.
Reeder, "Upgradeable Smart Contracts are Here!", GoChain, at least as early as Jun. 17, 2019, pp. 1-5.
Reeder, "Upgradeable Smart Contracts", gochain/gip, Aug. 2, 2018, pp. 1-2, Issue #22, GitHub.
Sag, "Delaware General Corporations Law (DGCL) compatible share token", GitHub, Feb. 14, 2018, pp. 1-6.
Spagnuolo, "Upgradeability using Unstructured Storage", Technical, Apr. 13, 2018, pp. 1-8, ZeppelinOS Blog.
Tanner, "Summary of Ethereum Upgradeable Smart Contract R&D", Indorse, Mar. 5, 2018, pp. 1-9.
Vogelsteller, "ERC-20 Token Standard", Nov. 19, 2015, pp. 1-4, GitHub.
Japanese Patent Office, "Notice of Reason for Rejection from JP Application No. 2021-506681", from Foreign Counterpart to U.S. Appl. No. 16/536,940, filed Sep. 10, 2021, pp. 1 through 16, Published: JP.
Saitoh et al. "All about the latest blockchain", Apr. 15, 2018, pp. 1 through 10.

\* cited by examiner

SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS

CROSS-REFERENCE TO RELATED APPLICATIONS

This application claims the benefit of U.S. Provisional Patent Application Ser. No. 62/717,575 filed on Aug. 10, 2018, entitled "SELF-ENFORCING SECURITY TOKEN IMPLEMENTING SMART-CONTRACT-BASED COMPLIANCE RULES CONSULTING SMART-CONTRACT-BASED GLOBAL REGISTRY OF INVESTORS"; U.S. Provisional Patent Application Ser. No. 62/871,543 filed on Jul. 8, 2019, entitled "SPLITTABLE SECURITY TOKEN"; and U.S. Provisional Patent Application Ser. No. 62/881,121 filed on Jul. 31, 2019, entitled "UPGRADEABLE SECURITY TOKEN"; all of which are hereby incorporated herein by reference.

This application is related to the following co-pending U.S. patent applications, which are hereby incorporated herein by reference:

U.S. patent application Ser. No. 16/536,866 entitled "SPLITTABLE SECURITY TOKEN" and filed on even date herewith, which is hereby incorporated herein by reference; and U.S. patent application Ser. No. 16/536,963 entitled "UPGRADEABLE SECURITY TOKEN" and filed on even date herewith, which is hereby incorporated herein by reference.

BACKGROUND

Currently, cryptographic tokens are used in connection with various aspects of blockchains. In examples, smart contracts implemented on an Ethereum blockchain enable the creation and issuance of tokens with complex behaviors attached to them. Ethereum Request for Comments 20 (ERC20) is a technical standard used for smart contracts (on the Ethereum blockchain) implementing tokens. The ERC20 standard is incorporated by reference in its entirety. Additionally, other methods may be implemented in order to satisfy Title 8 of the Delaware Code Relating to the General Corporation Law.

SUMMARY

A network node that includes at least one processor, at least one memory, and at least one network interface is disclosed. The network node is configured to be within a plurality of network nodes communicatively coupled in a peer-to-peer network of network nodes implementing a distributed ledger. The network node is configured to be communicatively coupled to at least one remotely located computing device through the at least one network interface. The at least one processor is configured to receive, from a remotely located computing device, a request to transfer a security token. The at least one processor is also configured to execute a plurality of compliance rules associated with the security token. At least one of the compliance rules is implemented using at least one smart contract. The at least one smart contract references a global registry. The at least one processor is also configured to transfer the security token based on the execution of the compliance rules.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
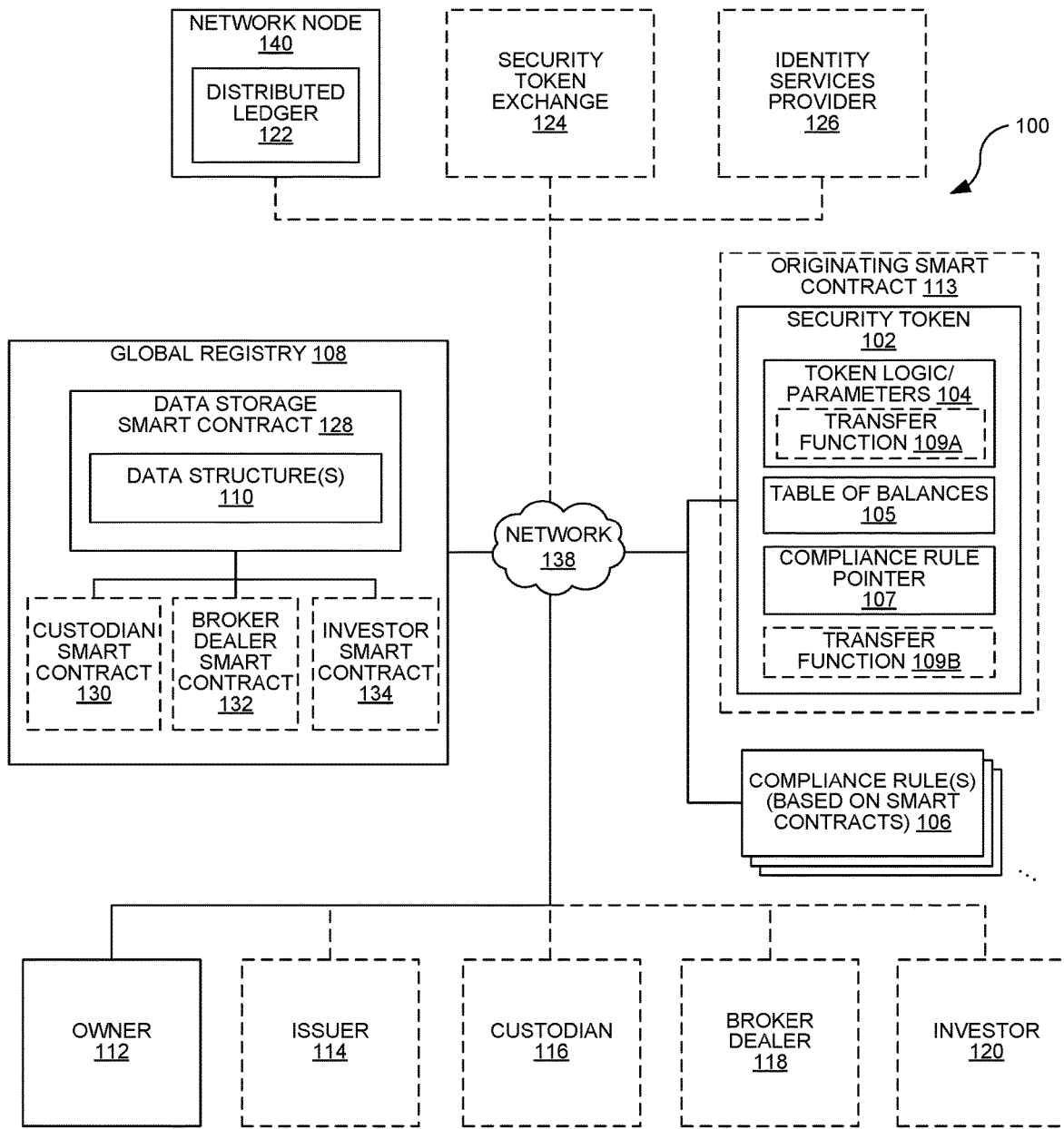
FIG. 1 is a block diagram of an example system using security tokens implementing smart-contract-based compliance rules that reference a global registry of investors.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Under regulations promulgated by the Securities and Exchange Commission (SEC), certain individuals may qualify to purchase tokens. In examples, this could apply to an asset that is regulated under SEC Regulation D, Regulation S, and/or Regulation A. Under these Regulations, certain individuals can qualify to transact at different times if they qualify under various exemptions to the regulations. Under U.S. federal securities laws, a company that offers or sells its securities must register the securities with the SEC or find an exemption from the registration requirements. For some exemptions, such as Rule 506 of Regulation D, a company may sell securities to an individual referred to as an accredited investor, which is defined in Rule 501 of Regulation D. There are also other exceptions under other parts of Regulation D, Regulation S, Regulation A, etc. As used herein, Regulation A refers to any of Rules 251-263 of Regulation A (as found in 17 C.F.R. § 230.251-230.263); Regulation D refers to any of Rules 501-506 of Regulation D (as found in 17 C.F.R. § 230.501-230.506); and Regulation S refers to any of Rules 901-905 of Regulation S (as found in 17 C.F.R. § 230.901-230.905).

Recently, the SEC has determined that cryptographic tokens may be considered securities based on individual circumstances. Many initial coin offerings (ICOs) are restricted to users that are outside the United States and other territories with strict securities regulation in order to avoid application of securities laws. However, this restriction limits the pool of investors and/or users that may purchase tokens.

In the examples described herein, a smart contract for a security token can reference (or include) at least one compliance rule to self-enforce compliance with applicable securities regulations. In examples, the at least one compliance rule includes commands to check for compliance with SEC Regulation D, Regulation S, or Regulation A. In some examples, at least one compliance rule verifies that specific users meet the requirements for purchase of a regulated token. In examples, at least one compliance rule determines whether the buyer qualifies as an accredited investors under Rule 501 of Regulation D.

One potential problem for security token transactions is the transfer of a security token to and/or from an investor that does not qualify under an exemption to the SEC regulations. Violations of SEC regulations can result in steep fines and/or criminal penalties. It is desirable to prevent security token transactions not complying with SEC regulations from being executed. Aside from possible fines and/or criminal penalties, an inadvertent violator of the SEC regulations may not be able to subsequently sell their security token(s) following a non-compliant purchase.

The examples described herein implement a self-enforcing security token. Specifically, the security token may include at least one compliance rule (or a pointer to compliance rule(s)) that reference a global registry of investors. The registry may include attributes of the investors so that the at least one compliance rule can determine whether a security token transaction complies, if necessary, with SEC regulations.

The examples described herein may be compatible with a custodial model where custodians hold security tokens on behalf of investors and/or broker dealers. However, the systems herein are also compatible with non-custodial models, e.g., where investors and/or broker dealers hold their security tokens directly with fewer or no intermediaries.

Various method names may be used herein as examples. It should be appreciated that any method names are illustrative in purpose, and not limiting. Additionally, optional devices and method steps are indicated with dashed lines in the Figures.

FIG. 1 is a block diagram of an example system 100 using security tokens 102 implementing smart-contract-based compliance rules 106 that reference a global registry 108 of investors. The system 100 may include one or more security tokens 102, a global registry 108, a system owner 112, an issuer 114, and at least one network node implementing a distributed ledger 122. The system 100 may also include various optional entities and/or devices, as described below.

A security token 102 is a cryptographic token that represents a security. A security may be any fungible, negotiable financial instrument that holds some type of monetary value. A security may represent an ownership position, a creditor relationship, or rights to ownership as represented by an option. Examples of securities include, without limitation, a piece of real property, at least one commodity, a piece of personal property, at least one bond, at least one derivative, at least one future, at least one fund, at least one currency fund, at least one exchange traded fund, at least one mutual fund, at least one index fund, at least one bond fund, at least one commodity fund, and/or at least one real estate fund. In examples, each security token 102 may represent a single share of a company. The security token 102 may be implemented as a smart contract on (e.g., stored on) a distributed ledger 122 (e.g., a blockchain).

An investor 120 may be a person or entity that has previously, or is considering, receiving or transferring a security token 102. In examples, an investor 120 may be a customer of a broker dealer 118 (or directly of the custodian 116), where the investor 120 may send orders to the broker dealer 118 (or directly to the custodian 116) relating to the purchase and/or sale of one or more security tokens 102. Alternatively, an investor 120 may be an "external investor" that does not need to connect to a broker dealer 118 or a custodian 116. Instead, an external investor may call the relevant methods described herein to initiate security token transactions, e.g., methods in the token 102 itself and/or the global registry 108, described below. An investor 120 may qualify under one or more exemptions to the SEC regulations (i.e., Regulation A, Regulation D, and/or Regulation S), thereby enabling the investor 120 to participate in security token 102 transactions as a buyer and/or a seller.

The term "security token transaction" or similar refers to any transfer of a security token 102, and may be used to describe an issuance, offering, gift, purchase, sale, and/or employee compensation carried out with the transfer of the security token 102. A security token 102 transaction may transfer a quantity of security tokens 102 from one or more input transaction addresses (belonging to one or more investors 120, broker dealers 118, and/or custodians 116) to one or more output transaction addresses (belonging to one or more investors 120, broker dealers 118, and/or custodians 116). As used herein, the terms "buyer" and "seller" refer to investors 120 that are transferring and receiving a security token 102, respectively.

In examples, compliance rules 106 may not be automatically triggered for some (e.g., on-exchange) transactions where the security token 102 itself is not updated to reflect the transaction, e.g., because a security token exchange 124 may enforce applicable SEC regulations. Optionally, the security token exchange 124 may independently call the compliance rules 106. In contrast, compliance rules 106 may be automatically triggered for peer-to-peer or other off-exchange transactions. In other words, security token 102 transactions invoking the transfer function 109 in the security token 102 may automatically trigger the compliance rules 106, while transactions not invoking the transfer function 109 in the security token 102 (e.g., on-exchange) may not automatically trigger the compliance rules 106 (although the compliance rules 106 may be called by means other than the transfer function 109 in the security token 102). For off-ledger transactions, if an investor 120 makes a deposit at a broker-dealer 118, the security tokens 102 will be held on deposit at a custodian 116 that is whitelisted (according to the SEC Regulations). The security token exchange 124 would then facilitate trades off-ledger. Compliance issues may be handled in a traditional manner. Withdrawals to an investor 120 wallet may also trigger one or more compliance rules 106.

Preferably, the system 100 includes at least one compliance rule 106 that is/are external to the security token 102. Alternatively, the at least one compliance rule 106 may be stored in the security token 102. Alternatively, configurations not using any compliance rules 106 are also possible, e.g., the default behavior might be to approve all transactions without respect to any compliance rules 106. Optionally, one or more security tokens 102 in the system 100 may reference one or more compliance rules 106, while one or more other security tokens 102 in the system 100 may not reference any compliance rules 106.

Additionally, the different compliance rule(s) 106 may be referenced depending on the types of entities involved in the security token 102 transaction. For example, custodian 116 to broker dealer 118 transactions, broker dealer 118 to custodian 116 transactions, custodian 116 to custodian 116 transactions, and/or broker dealer 118 to broker dealer 118 transactions (i.e., security token 102 transactions not involving investors 120) may reference few or no compliance rules 106. In contrast, security token 102 transactions involving investors 120 may reference more compliance rules 106 than security token 102 transactions not involving investors 120. Furthermore, different security tokens 102 may reference different compliance rules 106 that may or may not overlap, e.g., a first security token 102 may reference one or more first compliance rule(s) 106 relating to the exemptions to SEC Regulations A, D, and/or S, while a second security token 102 may only reference one or more second compliance rule(s) 106 relating to AML/KYC.

The broker dealer 118 may be a person or entity that purchases or sells security tokens 102 for its own account and/or on behalf of its customers. The term "onboarding" and its variants refers to the process of creating an account for a new customer, including collection of information, e.g., a broker dealer 118 may onboard an investor 120 as a new customer. The broker dealer 118 may be responsible for performing anti-money laundering and/or know-your-customer (AML/KYC) checks on its customers. Specifically, an identity services provider 126 may be one or more computing devices that provide AML/KYC services. AML services may include one or more steps to ensure that a potential (or current) customer is not in violation of relevant laws and regulations designed to combat money laundering, i.e., AML services seek to ensure that a potential (or current) customer is not taking steps to obscure the source of funds that were received from illegal or unethical activities. KYC services may include one or more steps to gather, review, and monitor information related to the identity and/or financial dealings of a potential (or current) customer. In examples, KYC services may include collecting basic identity data (e.g., name, contact information, etc.), verifying that the customer is who they say they are, and/or ensuring that the customer is not on any law enforcement watch lists. KYC services may also include performing a soft credit check (e.g., based on the customer's basic identity data), analyzing a customer's transactional behavior, and/or monitoring the customer's account for fraudulent behavior based on the customer's transaction behavior. AML/KYC may be required under various federal, state, and/or local laws, including SEC regulations.

The issuer 114 may be a person or entity that instructs the owner 112 to issue security tokens 102, i.e., the owner 112 may own one or more originating smart contracts 113 that deploy/issue security tokens 102. The system 100 may include up to many issuers 114. In examples, the issuer 114 may be a company where each security token 102 represents a share of the company.

The broker dealer 118 may have an account with a custodian 116, i.e., a person or entity that holds custody, possession, and/or ownership of security tokens 102 for one or more broker dealers 118. The custodian 116 may be a person or entity that holds custody, possession, and/or ownership of security tokens 102 on behalf of many broker dealers 118 (which broker dealers 118 may have many investors 120 as its customers). The system 100 may include many custodians 116 and/or many broker dealers 118.

An owner 112 may be a person or entity that owns, deploys, re-deploys, and/or transfers the smart contracts 102, 106, 128-134 in the global registry 108. In examples, the owner 112 may use a method call (e.g., that is executed by a virtual machine) to the originating smart contract 113 to deploy/issue security tokens 102. The owner 112 may also be referred to as the administrator of the system 100. For example, the owner 112 may have authority to place custodian 116 freezes. Optionally, the owner 112 may have authority to place security token 102 freezes, broker dealer 118 freezes, and/or investor 120 freezes. The different freezes may be implemented by changing settings in the global registry 108, and will be discussed below. Additionally, or alternatively, the custodian 116 and/or broker dealer 120 may have authority to place one or more types of freezes. The system 100 may only have a one or more owners 112. Optionally, the owner 112 may provide data services describing the "market" for a security token 102 based on the security token 102 transactions executed in the system 100, e.g., a feed indicating volume of security token 102 transactions, transaction price for the most recent security token 102 transaction, etc.

As described above, the terms owner 112, issuer 114, custodian 116, broker dealer 118, and investor 120 may refer to a person or entity filling the various roles in the system 100. Alternatively, these terms may refer to a computing device used by the owner 112, issuer 114, custodian 116, broker dealer 118, and investor 120, respectively. When referring to a computing device, each of the owner 112, issuer 114, custodian 116, broker dealer 118, and investor 120 may be implemented with one or more processors that execute instructions in a memory on the respective computing device. Each respective computing device may be a mobile device, such as a cell phone or tablet, personal computer, or a server configured to send and receive instructions and/or other data to other computing devices, e.g., via a network 138, such as the Internet.

A security token exchange 124 may be a marketplace or a business entity that operates the marketplace (or one or more computing devices operated by a security token exchange 124) in which security tokens 102, commodities, derivatives and/or other financial instruments are traded. In examples, the security token exchange 124 may record successfully executed transactions on the distributed ledger 122. The security token exchange 124 may be custodial, i.e., where custodians 116 hold and transact security tokens 102 on behalf of broker dealers 118 and/or investors 120.

The network node 140 may be a computing device implemented using one or more processors that execute instructions stored in memory to implement functionality described herein. In examples, a network node 140 may run a virtual machine (e.g., Ethereum Virtual Machine) that executes any of the smart contracts described herein.

The term "distributed ledger" refers to an electronic ledger that is distributed across multiple interconnected network nodes 140 (i.e., computing devices executing instructions stored in memory), where more than one of the network nodes 140 stores a copy of the distributed ledger 122. In examples, one or more network nodes 140 in a peer-to-peer network may implement the distributed ledger 122.

The distributed ledger 122 may implement one or more blockchains to validate the data stored within the distributed ledger 122. A blockchain is a verifiable permanent ledger constructed one block at a time with a proof-of-work seal (such as a hash) affixed to each block that validates that block. In a blockchain, the hash of the previous block is included in the current block, and therefore by recursion the current hash also validates all previous blocks back to the original genesis block. Inserting a hash into a blockchain permanently records that hash and acts as a notary verifying the time stamped proof-of-existence of the hashed data at the moment in time that block is added to the chain. Any future blocks add a layer of protection from manipulation of the data stored in the chain or a chain re-organization and therefore provide additional certainty that no changes can be made to blocks earlier in the chain. A blockchain is an implementation of a distributed ledger 122, and may be public (e.g., viewable by anyone) or private (e.g., viewable only to authorized users or entities). Exemplary blockchains include, but are not limited to, the Bitcoin blockchain, the Ethereum blockchain, BigchainDB, Billon, Chain, Corda, Credits, Elements, Monax, Fabric, HydraChain, Hyperledger, Multichain, Openchain, Quorum, Ravencoin, Sawtooth, and Stellar. Preferably, the distributed ledger 122 is the public Ethereum blockchain, however, other implementations are possible. If a private blockchain is used, a hash of the private blockchain may be periodically committed to (i.e., recorded on) a public blockchain, e.g., the Ethereum blockchain or Bitcoin blockchain.

Additionally, or alternatively, the distributed ledger 122 may implement a directed acyclic graph (DAG), e.g., IOTA or Hashgraph that uses a gossip protocol to share information between network nodes 140 of the system 100. Furthermore, consensus may be reached in the distributed ledger 122 without proof-of-work and can instead use proof-of-stake. Furthermore, any Merkle tree (or hash tree) that connects different sets of data using cryptographic hashes may be implemented by the distributed ledger 122.

The term "wallet" refers to a software program, digital file, and/or memory used to store and/or manage digital assets, such as security tokens 102. Although the present systems and methods are described herein using security tokens 102, they are also compatible with any type of digital asset. In examples, a wallet may be defined by one or more private keys, one or more public keys derived from one or more private keys, and/or one or more transaction addresses derived from one or more private keys and/or one or more public keys. In examples, a wallet may be defined by one or more private account keys (and optional corresponding public account key(s)), each of which may have one or more child and/or grandchild transaction keys. The term "account" may be used to refer to an address on the distributed ledger 122, e.g., an Ethereum address in a hierarchical deterministic (HD) wallet.

Security tokens 102 may be issued privately, e.g., as part of a pre-initial public offering (pre-IPO) to a dark pool of investors that qualify under the relevant exemptions to the SEC regulations. Alternatively, security tokens 102 may be issued as part of an initial public offering (IPO) under SEC regulations. The owner 112 may deploy/issue one or more security tokens 102, e.g., with a security token offering (STO). Optionally, the issuer 114 may instruct the owner 112 to deploy/issue one or more security tokens 102, e.g., with a security token offering (STO). An STO may include deploying/issuing or selling a security where the security is represented by a security token 102. Optionally, an STO may include allocating them to one or more wallets, e.g., belonging to the owner 112 or issuer 114. In examples, all deployed security tokens 102 may be initially allocated to a wallet belonging to the owner 112 or issuer 114 before allocation to individual investors 120. Alternatively, the deployed security tokens 102 may be directly allocated to wallets owned by the individual investors 120. An STO may include one or more originating smart contracts 113 issuing one or more security tokens 102.

Following initial deployment and allocation, the security token 102 may be used to transfer the asset that the security token 102 represents from one party to another, e.g., on a security token exchange (STX) or in a peer to peer (P2P) transaction (if permitted by the security token 102). Records of issuance and/or subsequent transactions of the security token 102 may be committed to (i.e., recorded in) the security token 102 itself and/or the distributed ledger 122.

The system 100 may be used to deploy, allocate and/or subsequently transfer various different types of security tokens 102. In examples, company A may deploy X security tokens 102 that each represent a share of company A and have a symbol AAAX, company B may deploy Y security tokens 102 that each represent a share of company B and have a symbol BBBX, and company C may deploy Z security tokens 102 that each represent a share of company C and have a symbol CCCX. Furthermore, security tokens 102 AAAX, BBBX, and CCCX may all be deployed, allocated, and/or tradeable in the same system 100.

Ethereum Request for Comments 20 (ERC20) is a standard defining a set of methods. To be compliant with ERC20, a cryptographic token (e.g., utility, cryptocurrency, or security) must implement these methods, although the owner of the token can implement the methods in their own way. One of the advantages of ERC20 is that each application, wallet, exchange, or interface doesn't have to be tailored to each specific token. Rather, if a project supports the ERC20 standard, it may support many different ERC20 tokens.

In order to comply with ERC20, the security token 102 may include token logic and/or parameters 104 that implements six required methods, including total Supply( ) balanceOf( ), transfer( ), transferFrom( ), approve( ), and allowance( ). These required methods describe how tokens can be transferred and how token-related data can be accessed. The token logic/parameters 104 may also implement various events to comply with ERC20, e.g., Transfer( ) and Approval( ). These events describe formatting guidelines for transfers and approvals. For example, the Transfer( ) method/function 109A-B (in the token logic/parameters 104 or outside the token logic/parameters 104) may be called when a security token 102 transaction is requested, and the Transfer( ) function 109 may further call method(s) in one or more smart contracts 130-134 in the global registry 108 and/or compliance rule(s) 106, e.g., to check/verify that an address (e.g., Ethereum address) is associated with an investor 120, custodian 116, or broker dealer 118 in the system 100. The token logic/parameters 104 may also implement one or more optional methods to comply with ERC20, such as name( ), symbol( ), and/or decimals( ). These optional methods can be used to assign the security token 102 a name and a symbol, as well as define the number of decimals the security token 102 uses, respectively. These methods and events may be executed by a virtual machine (e.g., the Ethereum Virtual Machine) on a network node 140, and are further described in the ERC20 standard.

The token logic and/or parameters 104 may also include data that indicates the name of the security token 102, how many security tokens 102 of the same type were deployed or issued, and/or a symbol for the security token 102. In examples, the symbol of a security token 102 may be a multi-character (e.g., four or five) identifier for the security token 102 similar to a stock ticker symbol. The symbol of a security token 102 may be registered with Financial Industry Regulatory Authority (FINRA). The security token 102 symbol issued by a company may preferably be an extended version of the company's ticker symbol, e.g., by concatenating a particular character (e.g., Q, X, or Z) to the end of the company's ticker symbol.

The security token 102 may also include a table of balances 105. The table of balances 105 may indicate balances of all holders of a particular type of security tokens 102, e.g., the table of balances 105 may indicate what addresses (e.g., Ethereum addresses) hold what quantity of a security token 102. Instead of indexing by investor 120 (or custodian 116 or broker dealer 118) address, the table of balances 105 may be indexed in other ways, e.g., a hash of the investor's name, etc. The table of balances 105 for a security token 102 may be public, semi-public, or private, and may be anonymous such that balances of security tokens 102 held by a particular investor 120, custodian 116, or broker dealer 118 cannot be derived purely from publicly-available information.

The table of balances 105 may account for all security tokens 102 that have been deployed or issued. When a transfer of the security token 102 occurs (i.e., balances change), the table of balances 105 may be updated and distributed to each copy of the security token 102 stored on the different network nodes 140. Optionally, the table of balances 105 may also include a length of time a particular security token 102 has been owned by a current holder (i.e., investor 120 or custodian 116), e.g., based on previous transaction data of the particular security token 102. In examples, the transfer of a security token 102 may include updating the table of balances 105 in the security token 102. Table 1 is an example table of balances 105 that includes a key/value pair for each investor address:

TABLE 1

| Investor, Custodian, or Broker Dealer Address | Security Token Balance |
|---|---|
| 0x7d2a3d9f938e13cd947eb85a924bb34df8dd866 | 525 |
| 0x1d2a3d9f991e13c5da7ec05a1c7fe734df8dd84a | 50 |
| 0x1d2a3da66b8f13c5da7e9d5afc7fe734df8dd826 | 15000 |
| 0x1d2a3d9f938e13c4fa7ec0577c7fe734df8dd55e | 1100 |

However, security tokens 102 (unlike other types of tokens) may be regulated by the Securities and Exchange Commission (SEC) in the United States. Accordingly, it may be desirable to satisfy Title 8 of the Delaware Code Relating to the General Corporation Law, which is important because many publicly traded companies are incorporated in Delaware. Additional methods satisfying Title 8 are referred to as Title 8 methods herein and may be implemented in a variety of ways, e.g., with or without Ethereum Request for Comments 884 (ERC884). Specifically, the Title 8 methods allows for the creation of tokens where each token represents a single share issued by a Delaware corporation, i.e., such tokens may be designed to represent equity issued by any Delaware corporation, whether private or public.

Accordingly, the token logic and/or parameters 104 may implement one or more Title 8 methods (beyond the six required by ERC20): including addVerified( ), removeVerified( ), updateVerified( ), cancelAndReissue( ), isVerified( ), isHolder( ), holderCount( ), holderAt( ), hasHash( ), isSuperseded( ), and/or getCurrentFor( ). The token logic/parameters 104 may also implement one or more events (beyond the six required for ERC20 compatibility), e.g., verifiedAddressAdded( ), VerifiedAddressRemoved( ), VerifiedAddressUpdate( ), and/or VerifiedAddressSuperseded( ), These Title 8 methods and events may be executed by a virtual machine on a network node 140.

However, SEC regulations impose additional requirements for security tokens 102 that are not required or enforced by ERC20 and/or the Title 8 methods. In other words, ERC20 and Title 8, individually and combined, do not cause security tokens 102 to automatically self-enforce compliance with SEC regulations.

In order to self-enforce compliance with SEC regulations, the system 100 may implement functionality beyond the Title 8 methods. Specifically, the security token 102 may include at least one compliance rule pointer 107, where each compliance rule pointer 107 indicates the address of at least one compliance rule 106 (that is implemented using one or more smart contracts). The at least one compliance rule pointer 107 may be updated, if necessary, to point to updated compliance rule(s) 106.

At least one of the compliance rules 106 references the global registry 108 (that is external to the security token 102), i.e., at least one of the compliance rules 106 accesses information stored in a data storage smart contract 128. By storing the compliance rules 106 outside of the security token 102, the at least one compliance rule 106 may be updated without modifying the security token 102 itself, e.g., if SEC regulations change and the at least one compliance rule 106 need to be updated. Alternatively, the at least one compliance rule 106 may be included in the security token 102 itself, in which case modifying (e.g., destroying and re-deploying) at least one compliance rule 106 would require modifying the security token 102. Optionally, security token 102 transactions not using any compliance rules 106 are also possible, e.g., the default behavior might be to approve all transactions without respect to any compliance rules 106

The term "smart contract" refers to a set of conditional logic that may be implemented in software, e.g., one or more sequential steps that are executed in response to one or more relevant conditions being satisfied. A smart contract may be stored at an address of a distributed ledger 122. In examples, smart contracts may be programmed in the Solidity programming language. Smart contracts may be executed by a processor on a network node 140, e.g., that is running a virtual machine, such as the Ethereum Virtual Machine (EVM). Multiple types of security tokens 102 (e.g., issued by different companies) can access the same smart-contract-based compliance rule(s) 106, but more preferably each type of security token 102 will use one or more unique smart-contract-based compliance rule(s) 106.

The compliance rules 106 may ensure that any transaction involving the security token 102 complies with the relevant SEC regulations. In examples, the compliance rules 106 may (1) verify that the buyer and/or the seller of the security token 102 qualify under at least one of SEC Regulations A, D, and S; (2) verify that AML, and/or KYC services have been performed for the buyer and/or seller; (3) verify that no freezes have been placed (discussed below) that would prevent the security token 102 from being transferred; and/or (4) verify that the particular security token 102 is not in a blackout period, i.e., a restriction that prevents the seller from selling the security token 102 for a certain period of time (e.g., one year) following acquisition of the security token 102. Verifying whether the security token 102 is in a blackout period may include traversing previous security token 102 transactions in the distributed ledger 122 to find the acquisition date that the seller acquired the security token 102, and comparing the acquisition date to the current date (e.g., by accessing a server's date) to determine the length of time that the seller has held the security token 102. If the length of time (that the seller has held the security token 102) equals or exceeds an applicable blackout period, the security token 102 is not in the blackout period.

At least one of the compliance rule(s) 106 may reference an external, global registry 108, e.g., via the network 138. The global registry 108 may be a collection of smart contracts 128-134. The smart contracts 128-134 include a data storage smart contract 128 that stores data. The data stored in the data storage smart contract 128 may be relevant to compliance with SEC regulations (such as indications of whether an investor 120 qualifies under exemptions to the SEC Regulations); personally identifiable information (PII) of an investor 120; an indication whether AML/KYC has been performed for the investor 120; and/or whether a freeze has been placed on a security token 102, custodian 116, broker dealer 118, and/or investor 120.

The data storage smart contract 128 may interface with a custodian smart contract 130, a broker dealer smart contract 132, and/or an investor smart contract 134 in the global registry 108. One advantage of implementing the global registry 108 using multiple smart contracts 128-134 is that it may be cheaper, in terms of transaction costs, to replace a portion of the code (e.g., the broker dealer smart contract 132) instead of the replacing the code encompassed by all the smart contracts 128-134, i.e., the cost of fixing bugs in the code may be reduced. Splitting the global registry 108 into multiple smart contracts 128-134 may also enable the global registry to comply with size limitations that may be imposed in certain distributed ledgers 122, e.g., Ethereum.

The smart contracts 128-134 in the global registry 108 may be stored on a public distributed ledger 122. Alternatively, the global registry 108 could be a traditional database that stores attributes of the security tokens 102, custodians 116, broker dealers 118, and/or investors 120 in the system 100, e.g., stored on a single computing device. Alternatively, the global registry 108 may be a database that stores attributes of the security tokens 102, custodians 116, broker dealers 118, and/or investors 120 on the distributed ledger 122 without utilizing smart contracts 128-134.

Optionally, an interface smart contract (not shown) may implement at least one method that can be used to access the custodian smart contract 130, the broker dealer smart contract 132, and/or the investor smart contract 134. In other words, the optional interface smart contract may act as an interface to other devices in the system 100. The methods implemented by the custodian smart contract 130 may be called by the owner 112. The broker dealer smart contract 132 may implement at least one method to add, remove, and/or update investor elements in one or more data structures 110 in the global registry 108. In examples, the methods implemented by the broker dealer smart contract 132 may be called by the custodian 116. The methods implemented by the investor smart contract 134 may be called by a broker dealer 118.

Therefore, in the preferred (but not only) configuration, only the owner 112 may call the methods implemented by the custodian smart contract 130, only a custodian 116 may call the methods implemented by the broker dealer smart contract 132, and only a broker dealer 118 may call the methods implemented by the investor smart contract 134. Optionally, more than the owner 112, custodian 116, and broker dealer 118 can call the methods implemented in the custodian smart contract 130, the broker dealer smart contract 132, and the investor smart contract 134, respectively. For example, a Transfer( ) function 109 or other smart contracts in the security token 102 (e.g., in the token logic/parameters 104) may call one or more methods in the custodian smart contract 130, the broker dealer smart contract 132, and/or the investor smart contract 134.

Each of the custodian smart contract 130, the broker dealer smart contract 132, and the investor smart contract 134 can read or write (assuming correct data permissions) data in the data storage smart contract 128. Specifically, one or more investor elements, custodian elements, and/or broker dealer elements may be created, modified, and/or removed from one or more data structures 110 in the data storage smart contract 128.

Furthermore, the global registry 108 may include more than one custodian smart contract 130, broker dealer smart contract 132, and/or investor smart contract 134. For example, the global registry 108 may include a first custodian smart contract 130, broker dealer smart contract 132, and/or investor smart contract 134 for security tokens 102 relating to a first asset type (e.g., equity shares), and a second custodian smart contract 130, broker dealer smart contract 132, and/or investor smart contract 134 for security tokens 102 relating to a second asset type (e.g., bonds).

In examples, one or more of the custodian smart contract 130, broker dealer smart contract 132, and/or investor smart contract 134 may be a pointer to other smart contract(s) (not shown) that implement the functionality. Such a configuration would allow for partial (and therefore cheaper) updates to the smart contracts 130-134 in the global registry 108, i.e., the pointer in the custodian smart contract 130, broker dealer smart contract 132, and/or investor smart contract 134 could remain constant, so the calling security tokens 102 or entities 112-120 would not have to be updated each time the one of the smart contracts 130-134 is updated. In other words, one or more smart contracts 130-134 may each point to one or more dynamic (i.e., updatable) smart contracts (not shown) in the global registry 108, e.g., the dynamic smart contract(s) could be destroyed and/or re-deployed without changing the particular smart contract 130-134 that is called by other smart contracts or entities in the system 100.

Figure 2A:
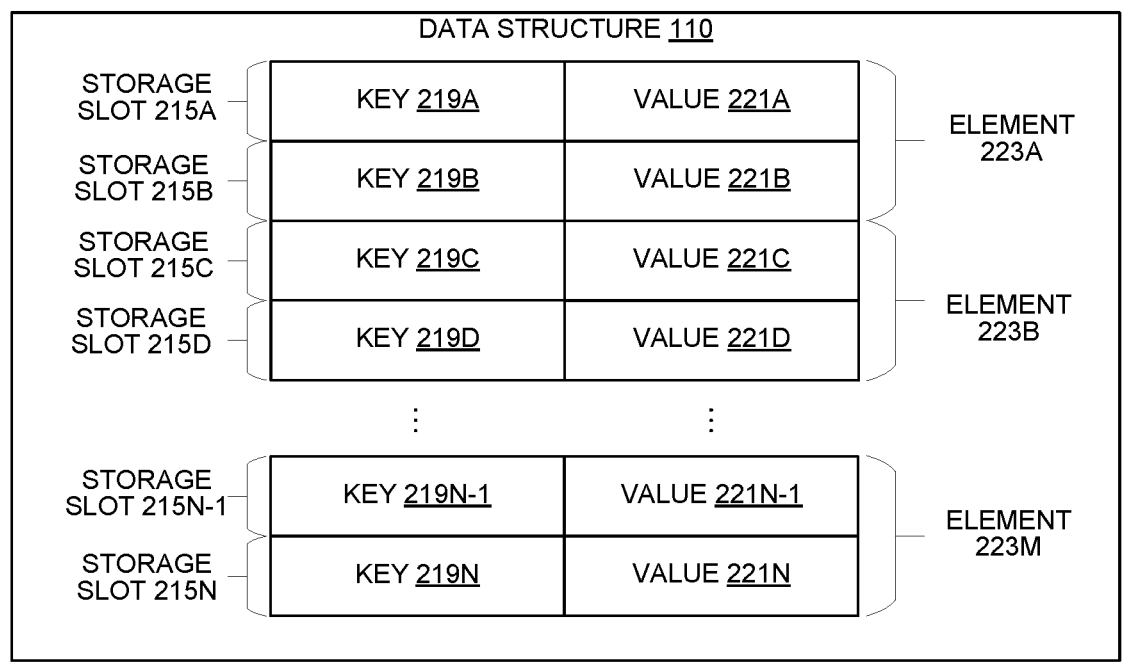
FIG. 2A is a block diagram illustrating a data structure used in the system illustrated in FIG. 1.

A data structure 110 may store at least one investor element, each with personally identifiable information (PII) about a particular investor. Additionally, each investor element may include an accreditation date (i.e., the date that a determination was made that the investor 120 qualifies under one or more exemptions to the SEC Regulations), an expiration date of accreditation, an indication whether a freeze has been placed on the investor 120, an address (e.g., Ethereum address) of the investor's broker dealer 118, and/or the investor 120 country of origin. Optionally, each investor element may include other parameters, e.g., (1) whether the investor 120 qualifies under SEC Regulation A; (2) whether the investor 120 qualifies under SEC Regulation D; (3) whether the investor 120 qualifies under SEC Regulation S; (4) whether AML/KYC been performed by the broker dealer 118; and/or (6) a length of time a particular security token 102 has been owned by the investor 120, and any information that is relevant to compliance with SEC regulations governing the transfer of the security token 102. The attributes in an investor element (e.g., a value in a slot in an investor element) may be stored as comma-separated values, a hash table, a mapping, a dictionary, and/or key/ value pairs, etc., e.g., as illustrated in FIG. 2A.

In examples, the data storage smart contract 128 may store at least one investor element for each investor 120. The data storage smart contract 128 may store multiple investor elements for a particular investor 120 if the investor 120 is a customer of multiple different broker dealers 118, i.e., the data storage smart contract 128 may store a first investor element for the investor 120 according to information collected by a first broker dealer 118 during a first onboarding, a second investor element for the investor 120 according to information collected by a second broker dealer 118 during a second onboarding, etc. In examples, only the broker dealer 118 associated with the investor element (or their agent) may update the information for that investor element, i.e., to prevent other broker dealers 118 from interfering with data (relevant to SEC Regulation compliance) that is collected by a broker dealer 118. Different investor elements for the same investor 120 (at different broker dealers 118) may be stored in the same data structure 110. Storing an investor element for each instance of the investor 120 per broker dealer 118 (that the investor 120 has an account with) may allow each broker dealer 118 to be responsible for its own compliance processes without having to rely information collected by other broker dealers 118.

It should be noted that, while the data storage smart contract 128 is described herein as storing a separate investor element for each instance of the investor 120 per broker dealer 118 that the investor 120 has an account with, other configurations in which the data storage smart contract 128 stores a single investor element (for an investor 120 having accounts with multiple broker dealers 118) are possible.

One or more of the attributes in an investor element may be derived from information about the investor 120 (e.g., under SEC Rule 17a-3(17)) collected by the broker dealer 118 during onboarding, e.g., customer name; tax identification number (e.g., Social Security number); address; telephone number; date of birth; driver's license, passport information or information from other government-issued identification; employment status and occupation; whether the customer is employed by a brokerage firm; annual income; net worth; and/or account investment objectives. Additionally, or alternatively, one or more pieces of personally identifiable information (PII) may be stored as attributes in an investor element. PII may include any data that can be used to distinguish individual identity, e.g., name, address, email address, tax identification number, etc. PII may be included in the data collected from an investor 120 by each broker dealer 118 during onboarding (e.g., as part of SEC Rule 17a-3(17) data collection) or otherwise. In examples, the PII (or the PII padded with filler data) may be encrypted into a PII hash that is stored as an investor attribute 110 in an investor element. Alternatively, the investor 120 may encrypt the PII (or the PII padded with filler data) into a PII hash that is stored as an investor attribute 110 in an investor element, e.g., if the investor 120 is an external investor that doesn't connect through a broker dealer 118 or a custodian 116.

Since the qualification status of an investor 120 (under exemptions to the SEC regulations) can change over time, the data storage smart contract 128 may be updated. In examples, updating the individual entries may include adding, removing, or modifying investor elements when appropriate. In examples, when a broker dealer 118 onboards an investor 120, a new investor element may be created and stored, e.g., in the data storage smart contract 128. In examples, when an investor 120 changes accreditation status (or information from which accreditation status is derived, e.g., income, net worth, etc.) or personally identifiable information (PII), the PII hash in the investor element for the investor 120 (and broker dealer 118) may be updated. In examples, when the investor 120 closes their account with a broker dealer 118, the corresponding investor element may be removed from the data storage smart contract 128.

As mentioned above, the data storage smart contract 128 may include an investor element for each instance of the investor 120 per broker dealer 118 that the investor 120 has an account with, i.e., the data storage smart contract 128 may store multiple investor elements for an investor 120 with accounts at multiple broker dealers 118. In examples, the investor element(s) for an investor 120 may only be created, updated, and/or removed by a broker dealer 118 that the investor 120 is associated with, however, other configurations are possible. Accordingly, each broker dealer 118 can preferably create, modify, or remove an investor element that is associated with investors 120 that are customers of the respective broker dealer 118. Creation, modification, and/or removal of an investor element may be performed by the investor smart contract 134. A broker dealer 118 may call a method implemented by the investor smart contract 134 directly. Alternatively, the broker dealer 118 may call a method implemented by an optional interface smart contract, and the optional interface smart contract may call a method implemented by the investor smart contract 134. Alternatively or additionally, an external investor may create, modify, and/or remove an investor element by calling method(s) implemented by the investor smart contract 134 directly or by an optional interface smart contract.

Optionally, one or more other types of elements may be stored in the data storage smart contract 128 that include attributes about various actors in the system 100. In examples, the other elements (i.e., other than investor elements) may include at least one custodian element, at least one broker dealer element, and/or at least one security token element. In examples, the broker dealer element for a broker dealer 118 may only be created, updated, and/or removed by a custodian 116 (e.g., by calling the broker dealer smart contract 132) that the broker dealer 118 is associated with, however, other configurations are possible. In examples, the custodian element for a custodian 116 may only be created, updated, and/or removed by the owner 112 (e.g., by calling the custodian smart contract 130), however, other configurations are possible. Optionally, an issuer element and/or security token exchange element may be stored for every issuer 114 and/or security token exchange 124 in the system. The attributes in one of the other elements (e.g., a value in a slot in an element) may be stored as comma-separated values, a hash table, a mapping, a dictionary, and/or key/value pairs, etc.

As will be discussed below, the system 100 may enable various freezes relating to the security token 102. In examples, the system 100 may allow a security token 102 freeze, a custodian 116 freeze, and/or an investor 120 freeze. Optionally, the system 100 may enable a broker dealer 118 freeze, a security token exchange 124 freeze, and/or an issuer 114 freeze. The freezes may use and/or modify attributes in one or more investor elements and/or one or more other types of elements, depending on the type of freeze. In examples, only investor 120 freezes, custodian 116 freezes, and security token 102 freezes are possible (not broker dealer 118 freezes, security token exchange 124 freezes, and/or issuer 114 freezes).

FIG. 2A is a block diagram illustrating a data structure 110 used in the system 100 illustrated in FIG. 1. One or more data structures 110 may be stored in the data storage smart contract 128. Each data structure 110 may include one or more elements 223A-M, where each element 223 corresponds to (i.e., include information about) a particular custodian 116, broker dealer 118, or investor 120. Optionally, security token elements 223 may also be stored in one or more data structures 110.

In some configurations, all elements 223 in a particular data structure 110 correspond to the same type of entity, e.g., all elements 223 correspond to investors 120 in the system 100. In this configuration, the data storage smart contract 128 may include a first data structure 110 for all investors 120, a second data structure 110 for all custodians 116, a third data structure 110 for all broker dealers 118, and/or a fourth data structure 110 for all security tokens 102 in the system 100. Alternatively, a particular data structure 110 may include elements 223 corresponding to different types of entities, i.e., investor element(s) 223, custodian element(s) 223, and broker dealer element(s) 223 may be included in a single data structure 110.

Each element 223 may include two storage slots 215A-N where each storage slot is a fixed number of bytes. For example, a storage slot may be 32 bytes long (or any suitable length), e.g., each storage slot 215 may be slot in the Solidity programming language. Although each element 223 is illustrated in FIG. 2A as including two storage slots 215 (i.e., N=2M), an element 223 may include only a single storage slot 215 (i.e., N=M) or more than two storage slots 215 (i.e., N>2M).

Each storage slot 215 may include a key 219A-N and a value 221A-N, i.e., a key/value pair. Each key 219 may be a nested structure with a first level indicating the type of entity the element 223 corresponds to (e.g., custodian 116, broker dealer 118, investor 120, etc.) and a second level that indicates an address (e.g., Ethereum address) owned by the particular entity. In this way, the key 215 may be encoded (with the type of entity). Instead of indexing by address, the second level of the key 219 may be indexed in other ways, e.g., a hash of the entity/investor/security token name, etc. Optionally, the keys 219 may include more than two levels. If the element 223 includes two slots 215, the key 219 in the first storage slot 215 of the element 223 may be the same or different than the key 219 in the second slot 215 of the element 223.

The information included in the values 221 may vary depending on the type of entity the element 223 corresponds to. Each value 221 in the data structure 110 may be a nested structure with a first level indicating the type of entity the element 223 corresponds to (e.g., custodian 116, broker dealer 118, investor 120, etc.) and one or more additional levels indicating additional information. In this way, the value 221 may be encoded (with the type of entity) so that a computing device (e.g., a network node 140) will know how to interpret the data in the value 221. In other words, a computing device (e.g., a network node 140) will interpret the data in the value 221 differently based on the encoding, i.e., the type indicated in the value 221. Multiple parameters may be bit-shifted (and/or concatenated) so they fit in the same value 221.

For example, the value 221 in a first storage slot 215 in a particular investor element 223 may include one or more bits indicating "investor" in the first level and the PII hash for the investor 120 in the second level. Furthermore, the value 221 in the second storage slot 215 in the investor element 223 may include (1) one or more bits indicating "investor" in the first level; (2) one or more bits indicating date of accreditation (and/or expiration date of accreditation) in a second level, i.e., the date that a determination was made that the investor 120 qualifies under one or more exemptions to the SEC Regulations; (3) one or more bits indicating whether a freeze has been placed on the investor 120 in a third level, e.g., a single bit (e.g., isFrozen flag); (4) an address (e.g., Ethereum address) of the investor's broker dealer 118 in a fourth level; and/or (5) the investor 120 country of origin in a fifth level. Optionally, the second value 221 in a particular investor element 223 may include other parameters, e.g., (1) whether the investor 120 qualifies under SEC Regulation A; (2) whether the investor 120 qualifies under SEC Regulation D; (3) whether the investor 120 qualifies under SEC Regulation S; (4) whether AML/KYC been performed by the broker dealer 118; and/or (6) a length of time a particular security token 102 has been owned by the investor 120.

Examples of other data structures 110 include custodian elements 223, broker dealer elements 223, and/or optional security token elements 223. Each custodian element 223 may include attribute(s) about a particular custodian 116. The value(s) 221 in a particular custodian element 223 may include one or more bits indicating "custodian" in the first level and one or more bits indicating whether a freeze has been placed on the custodian 116 in a second level, e.g., a single bit (e.g., isFrozen flag). Optionally, a custodian element 223 may reference an address (e.g., Ethereum address) of one or more investor elements 223, broker dealer elements 223, and/or security token elements 223 that the custodian element 223 is associated with. For example, a custodian element 223 may include an address (e.g., Ethereum address) of one or more broker dealers 118 that the custodian 116 is associated with.

Each broker dealer element 223 may include attribute(s) about a particular broker dealer 118. The value(s) 221 in a particular broker dealer element 223 may include one or more bits indicating "broker dealer" in the first level and one or more bits indicating whether a freeze has been placed on the broker dealer 118 in a second level, e.g., a single bit (e.g., isFrozen flag). Optionally, a broker dealer element 223 may reference an address (e.g., Ethereum address) of one or more investor elements 223, custodian element 223, and/or security token elements 223 that the broker dealer element 223 is associated with. For example, a broker dealer element 223 may include an address (e.g., Ethereum address) of one or more custodians 116 that the broker dealer 118 is associated with.

Each security token element 223 may include attribute(s) about a particular security token 102. The value(s) 221 in an optional security token element 223 may include one or more bits indicating "security token" in the first level and one or more bits indicating whether a freeze has been placed on the security token 102 in a second level, e.g., a single bit (e.g., isFrozen flag). Various other information about the security token 102 may be included in the value(s) a security token element 223.

Each optional issuer element 223 may include attribute(s) about a particular issuer 114. The value(s) 221 in a particular optional issuer element 223 may include one or more bits indicating "issuer" in the first level and one or more bits indicating whether a freeze has been placed on the issuer 114 in a second level, e.g., a single bit (e.g., isFrozen flag). Optionally, an issuer element 223 may reference addresses (e.g., Ethereum addresses) of one or more investors 120, custodians 116, broker dealers 118 and/or security token 102 that the issuer 114 is associated with.

Figure 2B:
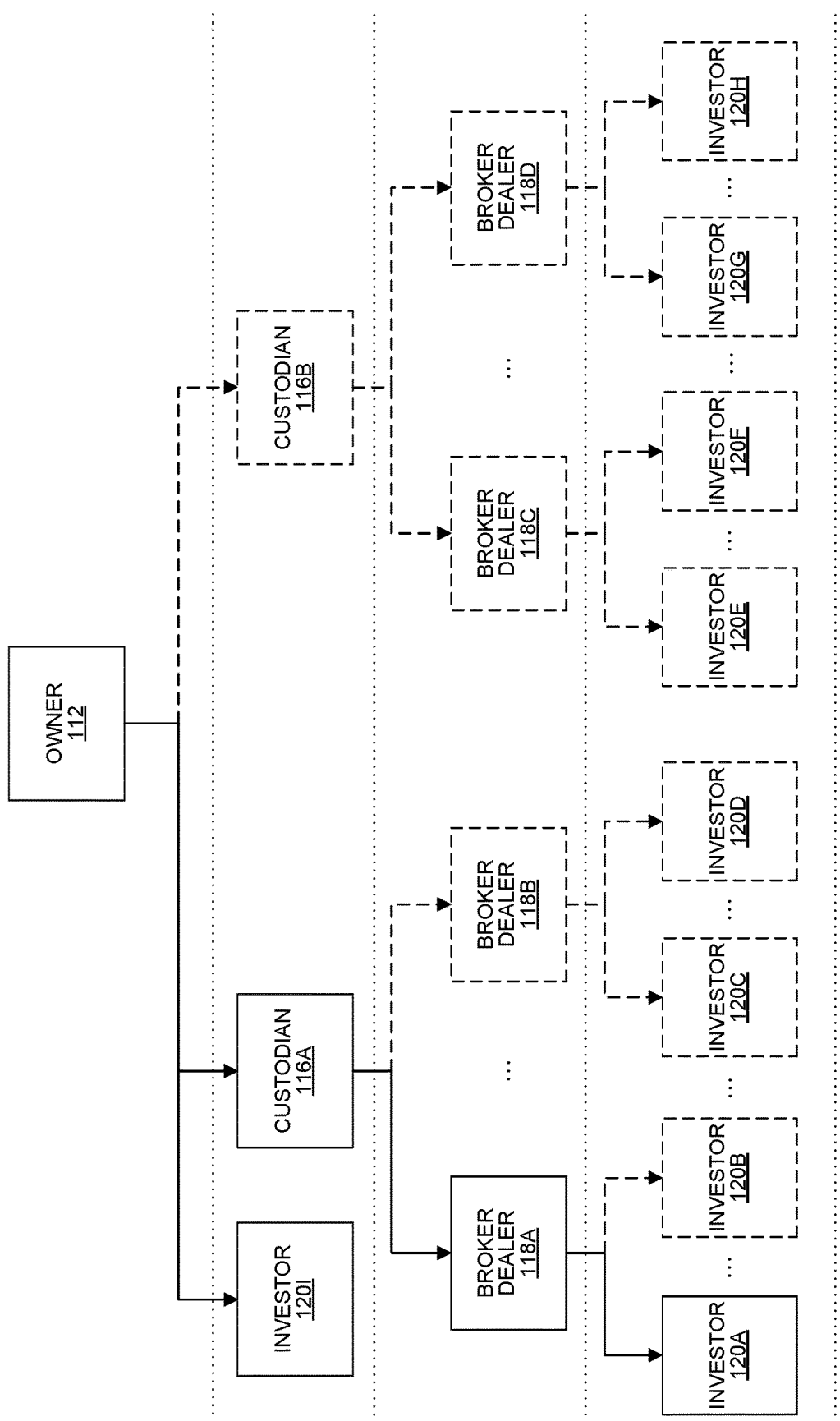
FIG. 2B is a block diagram illustrating a hierarchy of entities in the system illustrated in FIG. 1.

FIG. 2B is a block diagram illustrating a hierarchy of entities in the system 100 illustrated in FIG. 1. Specifically, FIG. 2B shows relationships between one or more investors 120, optional one or more broker dealers 118, optional one or more custodians 116, and/or one or more owners 112 of the system 100.

In examples, the hierarchy in FIG. 2B may define data permissions in the system 100. The hierarchy may be stored in any suitable form and/or may be implicit in the data stored in various elements 223.

When a security token 102 transaction is requested, the compliance rule pointer 107 in the security token 102 may point to at least one compliance rule 106 (e.g., smart contract(s)) that references an investor element 223 associated with the buyer and/or seller of the security token 102. Optionally, this may include the at least one compliance rule 106 passing an address (e.g., an Ethereum address that identifies an investor element 223) to the global registry 108. In examples, the at least one compliance rule 106 may perform one or more of the following actions: (1) ensure that the buyer and/or seller qualify under at least SEC Regulation A, D, or S; (2) ensure that AML/KYC has been performed for the buyer and/or seller in the security token 102 transaction; (3) ensure that the particular security token 102 is not in a blackout period (e.g., based on the length of time a particular security token 102 has been owned by the seller); and/or (4) ensure that no freezes have been placed on the buyer or seller.

A freeze may be placed on (or removed from) an investor 120 by changing data (e.g., a portion of a value 221) in a particular investor element 223 associated with the investor 120. Placing or removing a freeze on an investor 120 may require permissions based on the hierarchy in FIG. 2B. A custodian 116 may also place a freeze on an investor 120. In examples, a custodian 116A may have permission to place a freeze on investors 120A-D (for whom it holds security tokens 102) by changing data (e.g., a portion of a value 221) in the investor's 120A-D investor elements 223, i.e., since the custodian's 116A is associated with the investors 120A-D in the hierarchy. In contrast, a custodian 116B that is not associated with the investors 120A-D may preferably not have permission to place a freeze on the investors 120A-D since the custodian 116B is not associated with the investors 120A-D in the hierarchy. Optionally, a broker dealer 118A may have permission to place a freeze on its customer investors 120A-B, but may preferably not have permission to place a freeze on the investor 120A since the broker dealer 118 is not associated with investor 120A.

Optionally, an owner 112 of the system 100 may have permission to place a freeze on an investor 120 without regard to any hierarchy in FIG. 2B, e.g., in response to a court order when fraud is suspected. In some examples, if an investor 1201 is an external investor that is not a customer of any broker dealer 118 or custodian 116, the owner 112 (or issuer 114) alone may have permission to place a freeze on the investor 1201.

Alternatively, instead of the at least one compliance rule 106 referencing an investor element 223 in the data storage smart contract 128, the at least one compliance rule 106 may directly store one or more attributes relevant to SEC Regulation compliance. In examples, there may be a separate compliance rule 106 for every investor 120 that directly indicates whether the investor 120 qualifies under SEC Regulation A, D, or S; whether AML/KYC has been performed; whether the particular security token 102 is in a blackout period; and/or whether a freeze has been placed on the investor 120. In this configuration, the compliance rules 106 may be updated when information relevant to SEC Regulations changes (instead of, or in addition to, changing the investor element(s) 223).

In one configuration, when an investor 120 has a freeze placed on them, the investor 120 may not participate in any security token 102 transactions as a buyer or a seller, i.e., security tokens 102 held by (or on behalf of) the investor 120 may be frozen (temporarily not transferrable). In an alternative configuration, a freeze on an investor 120 may only prevent the investor 120 from participating in security token 102 transactions involving certain broker dealer(s) 118 and/or custodian(s) 116 that placed the freeze, i.e., security tokens 102 held, by the freeze-placing custodian 116 or broker dealer 118, on behalf of the investor 120 may be frozen (temporarily not transferrable). In examples, if a particular investor 120 has a freeze placed on them by a first custodian 116 or broker dealer 118, but not a second custodian 116 or broker dealer 118, the investor 120 may be prevented from participating in transactions via the first custodian 116 or broker dealer 118, but not the second custodian 116 or broker dealer 118. In that case, the first custodian 116 or broker dealer 118 is not liable for regulatory determinations (or lack thereof) of the second custodian 116 or broker dealer 118 and vice versa. Additionally, this prevents the first broker dealer 118 from tampering with an investor element 223 created and maintained by the second broker dealer 118 and vice versa.

A data structure 110 may store multiple investor elements 223 for an investor 120 that has accounts at multiple broker dealers 118. In examples, a first investor element 223A may describe a particular investor 120, according to data collected by a first broker dealer 118A, e.g., during onboarding performed by the first broker dealer 118A. Similarly, a different investor element 223B may describe the same particular investor 120, according to data collected by a different broker dealer 118B, e.g., during onboarding performed by the different broker dealer 118B. Additionally or alternatively, an investor element 1201 may be stored for an external investor that is not a customer of a broker dealer 118 or custodian 116.

When a security token 102 transaction is requested, in addition to referencing an investor element 223 associated with the buyer and/or seller, the at least one compliance rule 106 (e.g., smart contract(s)) may reference one or more custodian elements 223 and/or one or more broker dealer elements 223 associated with the buyer and/or seller of the security token 102 (and optionally a security token element 223 associated with the security token 102). Optionally, this may include the at least one compliance rule 106 passing an address(es) (that identify the custodian element(s) 223, the broker dealer element(s) 223, and/or security token element 223) to the global registry 108. In examples, in addition to the various checks based on the investor element(s) 223, the at least one compliance rule 106 may ensure that no freezes have been placed on the custodian(s) 116, broker dealer(s) 118, and/or security token 102 associated with the security token 102 transaction.

A freeze may be placed on (or removed from) a custodian 116 or a broker dealer 118 by changing data (e.g., a portion of a value 221) in a particular custodian element 223 or broker dealer element 223 associated with the custodian 116 or broker dealer 118, respectively. Placing or removing a freeze on a custodian 116 or broker dealer 118 may require permissions based on the hierarchy in FIG. 2B. In examples, a custodian 116 associated with a broker dealer 118 may have permission to place a freeze on the broker dealer 118. In contrast, a custodian 116 not associated with a broker dealer 118 may preferably not have permission to place a freeze on the broker dealer 118. Optionally, an owner 112 may have permission to place a freeze on a custodian 116 or broker dealer 118 without regard to the hierarchy in FIG. 2B, e.g., in response to a court order when fraud is suspected.

When a freeze is placed on a custodian 116, security tokens 102 held by the custodian 116 may be frozen (temporarily not transferrable). Similarly, when a freeze is placed on a broker dealer 118, security tokens 102 held by (or on behalf of) the broker dealer 118 may be frozen (temporarily not transferrable).

A freeze may be placed on (or removed from) a security token 102 by changing data (e.g., a portion of a value 221) in a particular security token element 223. In examples, placing or removing a freeze on a security token may be performed only by an owner 112 of the system 100, e.g., if fraud is suspected or if the security token 102 is suspected of sponsoring terrorism. Without limitation, an owner 112 may place or remove a freeze on a security token 102 in response to a court order. When a freeze is placed on a security token 102, all outstanding security tokens 102 (for that token type) may be frozen (temporarily not transferrable).

Optionally, a freeze may be placed on an issuer 114 or a security token exchange 124 by changing data (e.g., a portion of a value 221) in a particular issuer element 223 or security token exchange element 223, respectively. In examples, placing or removing a freeze on an issuer 114 or a security token exchange 124 may be performed only by an owner 112 of the system 100, e.g., if fraud is suspected or if an issuer 114 or security token exchange 124 is suspected of sponsoring terrorism. Without limitation, an owner 112 may place or remove a freeze on a security token 102 in response to a court order. When a freeze is placed on an issuer 114, all outstanding security tokens 102 (issued/deployed by or on behalf of the issuer 114) may be frozen (temporarily not transferrable). When a freeze is placed on a security token exchange 124, no security token 102 transactions may be executed on the security token exchange 124.

Alternatively, instead of the at least one compliance rule 106 referencing a custodian element 223, a broker dealer element 223, and/or security token element 223 in the data storage smart contract 128, the at least one compliance rule 106 may directly store some of the attributes. In examples, there may be a separate compliance rule 106 for every custodian 116, broker dealer 118, and security token 102 that directly states whether a freeze has been placed on the custodian 116, broker dealer 118, or security token 102, respectively. In this configuration, the compliance rules 106 may be updated when freezes has been placed on a custodian 116, broker dealer 118, or security token 102 (instead of, or in addition to, changing the custodian element 223, broker dealer element 223, and security token element 223 in the data storage smart contract 128).

The smart contracts 128-134 implementing the global registry 108 may be executed by a virtual machine (e.g., the Ethereum Virtual Machine) running on a network node 140. Each entity in the system 100 may have different data permissions (other than freeze indications) to the data storage smart contract 128. In examples, the owner 112 may own the at least one smart contracts 128-134 in the global registry 108 and/or the at least one compliance rule 106. The owner 112 may be able to call one or more of the following methods (e.g., in the custodian smart contract 130) to modify the data storage smart contract 128: setCompliance Address( ) that sets an address (e.g., an Ethereum address) of the compliance rules 106, i.e., sets the compliance rule pointer 107; setRegistryAddress( ) that, for example, links an address of a smart contract, e.g., one of the smart contracts 128-134 implementing the global registry 108; setIssuer( ) that sets an address (e.g., an Ethereum address) of the owner 112 (or issuer 114) of a security token 102 in the system 100; addCustodian( ) that adds an address (e.g., an Ethereum address) of a new custodian 116 to the data storage smart contract 128; and removeCustodian( ) that removes an address (e.g., an Ethereum address) of an existing custodian 116 from the data storage smart contract 128.

An owner 112 (or optionally issuer 114) may be able to call one or more of the following methods (e.g., in the security token 102 or the originating smart contract 113): issue( ) that issues security tokens 102; cancelAndReissue( ) that replaces lost security tokens 102; and allowPeerToPeer( ) that toggles peer-to-peer functionality. Optionally, an issuer 114 (or owner 112) may call a method (e.g., freezeCustodian( ) that sets an isFrozen flag in a custodian element 223. Optionally, an owner 112 may call a method (e.g., freezeInvestor( ) that sets an isFrozen flag in an investor element 223.

A custodian 116 may be able to call, directly or indirectly via an optional interface smart contract, one or more of the following methods (e.g., in the broker dealer smart contract 132) to modify the data storage smart contract 128: addBrokerDealer( ) that adds an address (e.g., an Ethereum address) managed by a broker dealer 118; removeBrokerDealer( ) that removes an address (e.g., an Ethereum address) managed by a broker dealer 118; and setBrokerDealerAccounts( ) that adds addresses (e.g., Ethereum addresses) of broker dealer 118 and account numbers assigned to broker dealers 118 by the custodian 116, e.g., a list of addresses. Optionally, a custodian 116 may call a method (e.g., freezeBrokerDealer( )) that sets an isFrozen flag in a broker dealer element 223 that the custodian is associated with. Optionally, a custodian 116 may call a method (e.g., freezeInvestor( )) that sets an isFrozen flag in an investor element 223 that the custodian 116 is associated with.

A broker dealer 118 may be able to call, directly or indirectly via an optional interface smart contract, one or more of the following methods (e.g., in the investor smart contract 134) to modify the data storage smart contract 128: addVerified( ) that adds an investor element 223 to the data storage smart contract 128; removeVerified( ) that removes an investor element 223 from the data storage smart contract 128; and updateVerified( ) that updates the PII hash in an investor element 223 in the data storage smart contract 128. Optionally, a broker dealer 118 may call a method (e.g., freezeInvestor( )) that sets an isFrozen flag in an investor element 223 that the broker dealer 118 is associated with.

An investor 120 may be able to call the following method (e.g., in the security token 102 or the originating smart contract 113): transfer( ) function 109 that transfers funds and/or security tokens 102 between two addresses, to the investor's 120 broker dealer 118 address held at the custodian 116 (even if peer to peer security token 102 transactions are enabled in the security token 102).

Additionally, the transfer function 109 may reference different compliance rule(s) 106 depending on the types of entities involved in the security token 102 transaction. For example, for security token 102 transactions not involving investors 120, the transfer function 109 may reference few or no compliance rules 106. In contrast, for security token 102 transactions involving investors 120, the transfer function 109 may reference more compliance rules 106 than security token 102 transactions not involving investors 120. Furthermore, for transactions for different security tokens 102, the transfer function 109 may reference different compliance rules 106 that may or may not overlap. For example, the transfer function 109 may reference one or more first compliance rule(s) 106 relating to the exemptions to SEC Regulations A, D, and/or S for transactions of a first security token 102, but only one or more second compliance rule(s) 106 relating to AML/KYC for transactions of a second security token 102.

Figure 3:
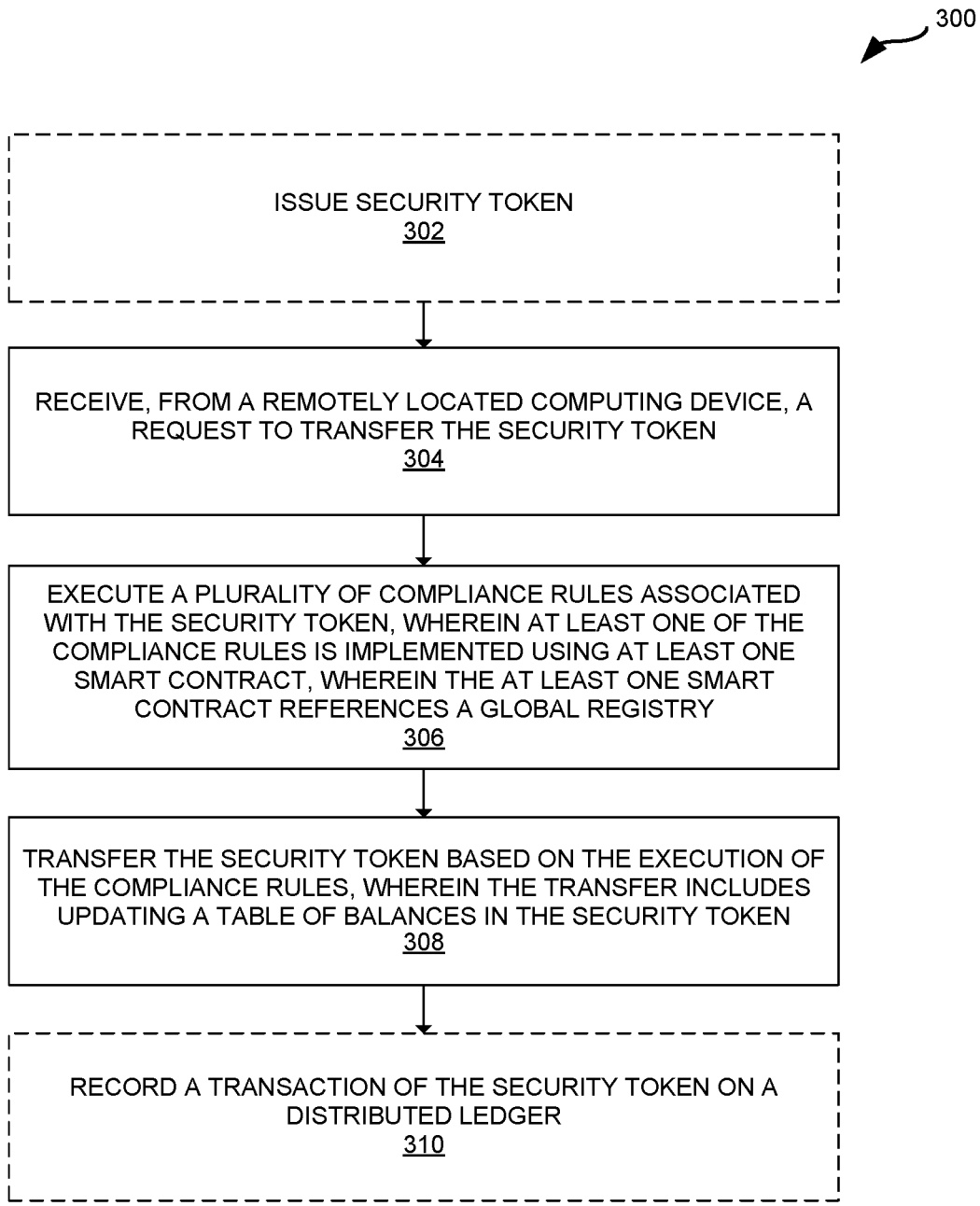
FIG. 3 is a flow diagram illustrating a method for transferring a self-enforcing security token.

FIG. 3 is a flow diagram illustrating a method 300 for transferring a self-enforcing security token 102. The security token 102 is self-enforcing because it automatically complies with one or more exemptions to the SEC regulations, e.g., SEC Regulation A, D, and/or S. The method 300 may be performed by devices in the system 100 including, but not limited to, a network node 140.

Optionally, a security token 102 may be issued 302, e.g., in a security token offering (STO) that deploys many (e.g., hundreds, thousands, or millions of) security tokens 102. The STO may be performed in response the owner 112 (or issuer 114) calling a method (e.g., in the originating smart contract 113) that is executed by a virtual machine (e.g., the Ethereum Virtual Machine (EVM)) running on a network node 140 that stores a copy of the distributed ledger 122. The security tokens 102 deployed during the STO may be allocated to a single wallet (e.g., belonging to the issuer 114 or owner 112) before being allocated to individual investor 120 wallets. Alternatively, the security tokens 102 deployed during the STO may be allocated directly to individual investor 120 wallets. The STO may be performed according to an originating smart contract 113 associated with a particular type of security tokens 102. The originating smart contract 113 may be owned by the owner 112.

A record of the issuance of the security token 102 may optionally be committed to the distributed ledger 122. This record may include one or more input transaction addresses, one or more output transaction address, and/or a quantity of security tokens 102 being issued.

At least one processor in the network node 140 may be configured to receive 304 a request to execute a security token 102 transaction, i.e., a transaction to transfer the security token 102. The request may be received (e.g., at the network node 140) from an investor 120, a broker dealer 118 on behalf of the investor 120, or a custodian 116 on behalf of a broker dealer 118. In any case, the request may be received from a computing device that is remotely located from the network node 140.

The at least one processor in the network node 140 may also be configured to execute 306 a plurality of compliance rules 106 associated with the security token 102. At least one of the compliance rules 106 may be implemented with one or more smart contracts that references the global registry 108. The compliance rules 106 may be referenced by a compliance rule pointer 107 stored in the security token 102. Alternatively, the compliance rules 106 may be stored in the security token 102. The execution of the compliance rules 106 is described in FIG. 4.

The at least one processor in the network node 140 may also be configured to transfer 308 the security token 102 based on the execution of the compliance rules 106. In examples, the security token 102 may be transferred only if (1) the buyer and/or the seller of the security token 102 qualify under at least one of SEC Regulations A, D, and S; (2) AML and/or KYC services have been performed for the buyer and/or seller; (3) no freezes have been placed (discussed below) that would prevent the security token 102 from being transferred; and/or (4) the security token 102 is not in a blackout period. Otherwise, the security token 102 may not be transferred, and optionally, the requesting investor 120 may be notified. In examples, the transfer may include updating the table of balances 105 in the security token 102.

Optionally, the at least one processor in the network node 140 may also be configured to record 310 a transaction of the security token 102 on a distributed ledger 122, e.g., a security token 102 transaction may be committed to the distributed ledger 122. When committed to the distributed ledger 122, one or more input transaction addresses belonging to the seller, one or more output transaction address belonging to the buyer, and/or a quantity of security tokens 102 being transferred may be committed to the distributed ledger 122.

Figure 4:
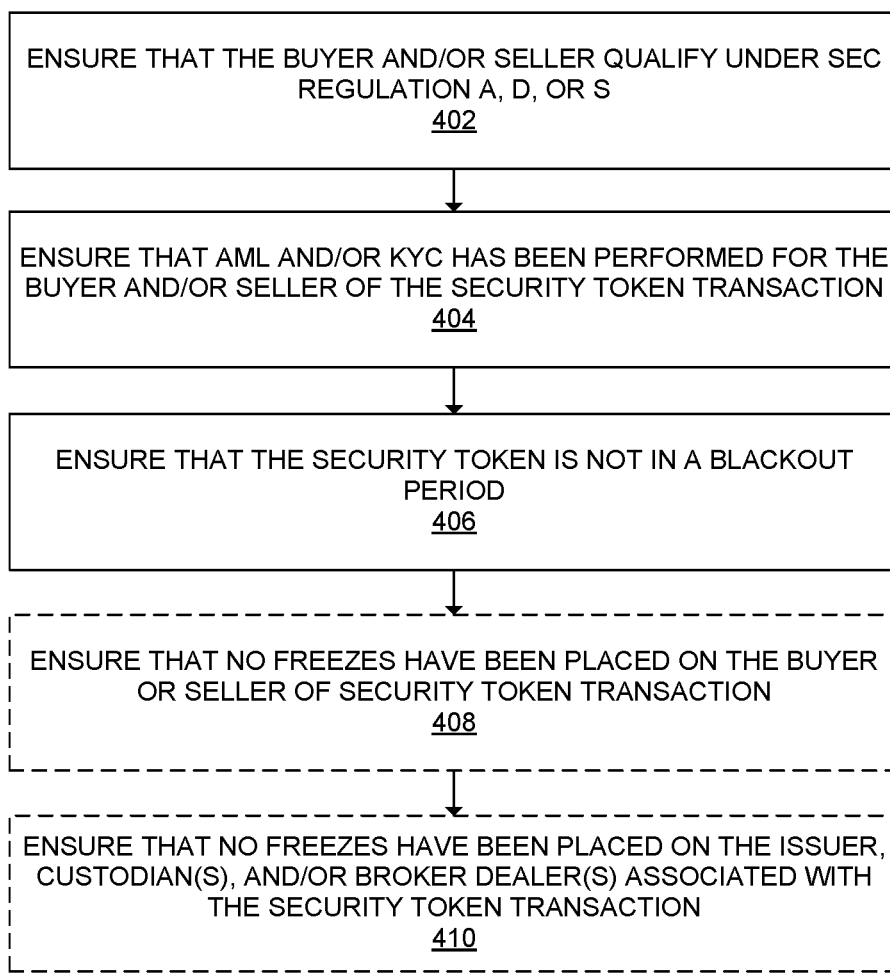
FIG. 4 is a flow diagram illustrating a method for executing at least one compliance rule.

FIG. 4 is a flow diagram illustrating a method 400 for executing at least one compliance rule 106. The at least one compliance rule 106 may be implemented using at least one smart contract (or referenced by a compliance rule pointer 107) in the security token 102. The at least one compliance rule 106 may be executed by at least one processor running a virtual machine, e.g., at least one processor in a network node 140.

The at least one compliance rule 106 may reference the data storage smart contract 128, e.g., the at least one compliance rule 106 may reference an investor element 223 associated with the buyer and/or seller of the security token 102. Optionally, the at least one compliance rule may also reference a custodian element 223, a broker dealer element 223, and/or a security token element 223 relevant to the security token 102 transaction.

The at least one processor in the network node 140 may ensure 402 that the buyer and/or seller qualify under at least SEC Regulation A, D, or S. This may include deriving a qualification (under an exemptions to the SEC Regulations) based on one or more of the following attributes in an investor element 223: customer name; tax identification number (e.g., Social Security number); address; telephone number; date of birth; driver's license, passport information or information from other government-issued identification; employment status and occupation; whether the customer is employed by a brokerage firm; annual income; net worth; and/or account investment objectives. Each broker dealer 118 may be responsible (and have permissions) for updating attributes in investor elements 223 associated with its customer investors 120. Additionally or alternatively, the investor 120 may be responsible for creating, updating, and/or removing the attributes in the investor element 223 associated with itself, e.g., if an investor 120 is an external investor.

The at least one processor in the network node 140 may also ensure 404 that AML and/or KYC has been performed for the buyer and/or seller of the security token 102 transaction, e.g., AML alone, KYC alone, or AML and KYC. The AML and/or KYC determination may be made by an identity services provider 126 based on information received at a broker dealer 118, e.g., including PII collected during onboarding. Once the AML and/or KYC determination is made by the identify services provider 126 and sent to the broker dealer 118, the broker dealer 118 may store an indication of the AML and/or KYC determination in the global registry 108, e.g., as an attribute in an investor element 223 in a data structure 110 stored in the data storage smart contract 128. Alternatively, the mere presence of an investor element 223 in a data structure 110 may indicate that AML and/or KYC was successfully performed without any flags that would prevent the investor 120 from participating in security token 102 transactions, i.e., the investor element 223 may only be created in the data structure 110 in response to AML and/or KYC being successfully performed without any flags that would prevent the investor 120 from participating in security token 102 transactions.

The at least one processor in the network node 140 may also ensure 406 that the particular security token 102 is not in a blackout period (e.g., based on the length of time a particular security token 102 has been owned by the seller). This may include referencing information relevant to a security token 102 transaction that is not included in the global registry 108. In examples, the at least one compliance rule 106 may traverse previous security token 102 transactions in the distributed ledger 122 to find the most recent transaction of the security token 102 involved in the current security token 102 transaction. The date of the most recent transaction may then be compared to the current date (e.g., by accessing a server's date) to determine the length of time that the seller has held the security token 102. The length of time may be used to determine whether the security token 102 is in a blackout period. In examples, when the length of time is greater than the blackout period length, the security token 102 is not in a blackout period, and the security token 102 transaction may be executed. However, when the length of time is less than or equal to the blackout period length, the security token 102 is in a blackout period, and the security token 102 transaction may preferably not be executed.

Optionally, the at least one processor in the network node 140 may also ensure 408 that no freezes have been placed on the buying or selling investor 120. A freeze may be placed on (or removed from) an investor 120 by changing data (e.g., a portion of a value 221) in a particular investor element 223 associated with the investor 120. When an investor 120 has a freeze placed on them, security tokens 102 held by (or on behalf of) the investor 120 may be frozen (temporarily not transferrable). In an alternative configuration, only security tokens 102 held by the freeze-placing custodian 116 or broker dealer 118 (on behalf of the investor 120) may be frozen (temporarily not transferrable). A freeze may be placed on an investor 120 by a broker dealer 118 that the investor 120 has an account with, or a custodian 116 that investor's broker dealer 118 has an account with. An owner 112 may also place a freeze on an investor 120. A freeze may be placed on an investor 120, e.g., in response to a court order when fraud is suspected.

Optionally, the at least one processor in the network node 140 may also ensure 410 that no freezes have been placed on the custodian(s) 116, broker dealer(s) 118, and/or security token 102 associated with the security token 102 transaction. A freeze may be placed on (or removed from) a security token 102 by changing data (e.g., a portion of a value 221) in a particular security token element 223. In examples, placing or removing a freeze on a security token 102 may be performed only by an owner 112 of the system 100, e.g., if fraud is suspected or if security token 102 is suspected of sponsoring terrorism. The owner 112 may place or remove a freeze on a security token 102 in response to a court order. When a freeze is placed, outstanding security tokens 102 (of the particular type that is frozen) may be frozen (temporarily not transferrable).

When a freeze is placed on a custodian 116, security tokens 102 held by the custodian 116 may be frozen (temporarily not transferrable). Similarly, when a freeze is placed on a broker dealer 118, security tokens 102 held by (or on behalf of) the broker dealer 118 may be frozen (temporarily not transferrable).

Computer System Overview

Figure 5:
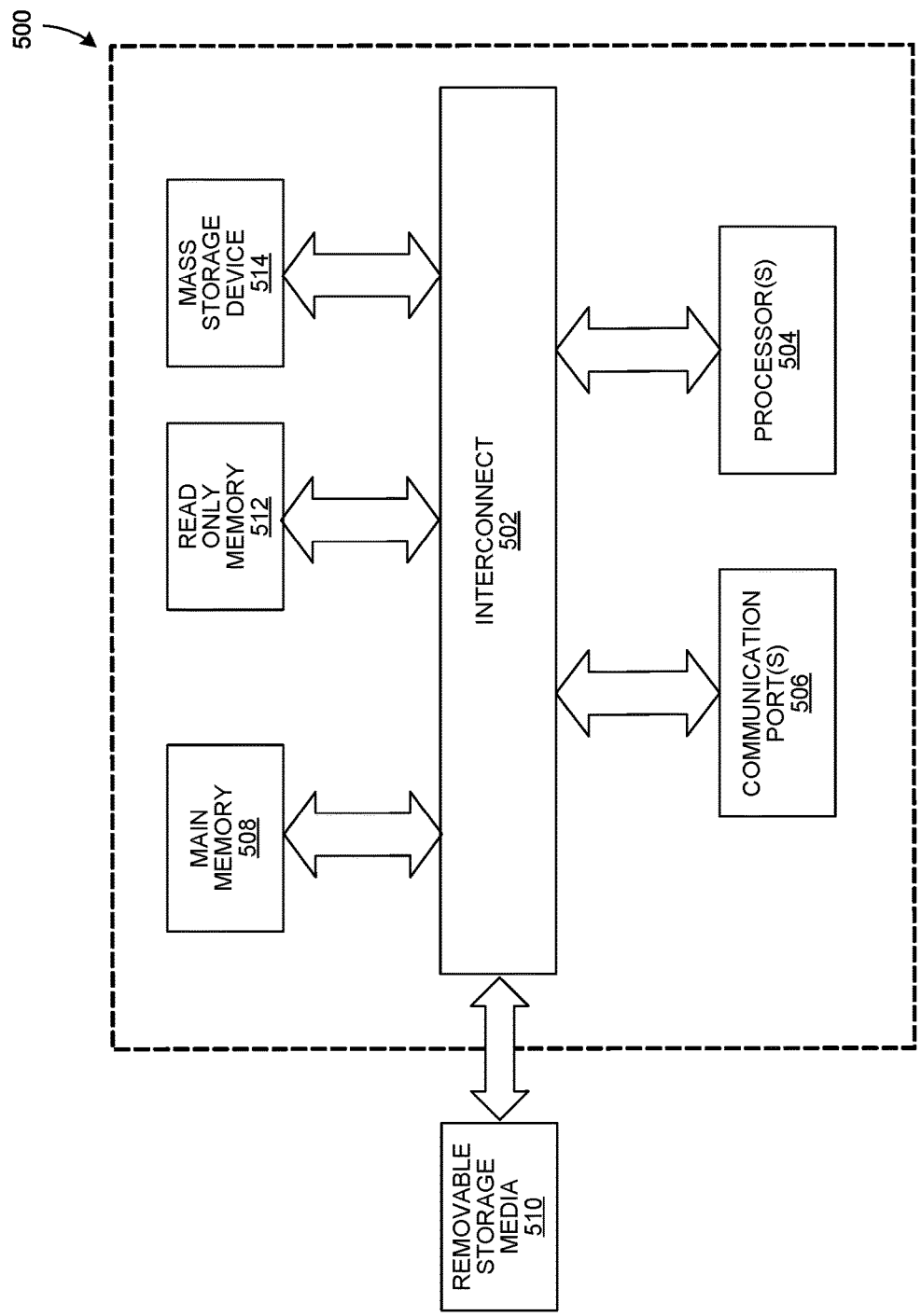
FIG. 5 is a block diagram illustrating an example computer system with which embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is a block diagram illustrating an example computer system 500 with which embodiments of the present disclosure may be utilized. According to the present example, the computer system 500 includes an interconnect 502, at least one processor 504, at least one communication port 506, at least one main memory 508, at least one removable storage media 510, at least one read only memory 512, and at least one mass storage device 514.

The at least one processor 504 can be any known processor. The at least one communication port 506 can be or include, In examples, any of an RS-232 port for use with a modem-based dialup connection, a 10/100 Ethernet port, or a Gigabit port using copper or fiber. The nature of the at least one communication port 506 may be chosen depending on a network such as a Local Area Network (LAN), Wide Area Network (WAN), or any network to which the computer system 500 connects. The at least one main memory 508 can be Random Access Memory (RAM), or any other dynamic storage device(s) commonly known in the art. The at least one read only memory 512 can be any static storage device(s) such as Programmable Read Only Memory (PROM) chips for storing static information such as instructions for the at least one processor 504.

The at least one mass storage device 514 can be used to store information and instructions. In examples, hard disks (such as magnetic disk drives or solid state drive using serial/parallel ATA or SCSI interfaces), an optical disc, an array of disks such as a Redundant Array of Independent Disks (RAID), or any other mass storage devices may be used. Interconnect 502 can be or include one or more buses, bridges, controllers, adapters, and/or point-to-point connections. Interconnect 502 communicatively couples the at least one processor 504 with the other memory, storage, and communication blocks. Interconnect 502 can be a PCI/PCI-X or SCSI based system bus depending on the storage devices used. The at least one removable storage media 510 can be any kind of external hard-drives, floppy drives, Compact Disc-Read Only Memory (CD-ROM), Compact Disc-Re-Writable (CD-RW), Digital Video Disc-Read Only Memory (DVD-ROM), Blu-Ray Disc Read Only Memory (BD-ROM), Blu-Ray Disc Recordable (BD-R), Blu-Ray Disc Recordable Erasable (BD-RE).

The components described above are meant to exemplify some types of possibilities. In no way should the aforementioned examples limit the disclosure, as they are only exemplary embodiments.

Figure 6:
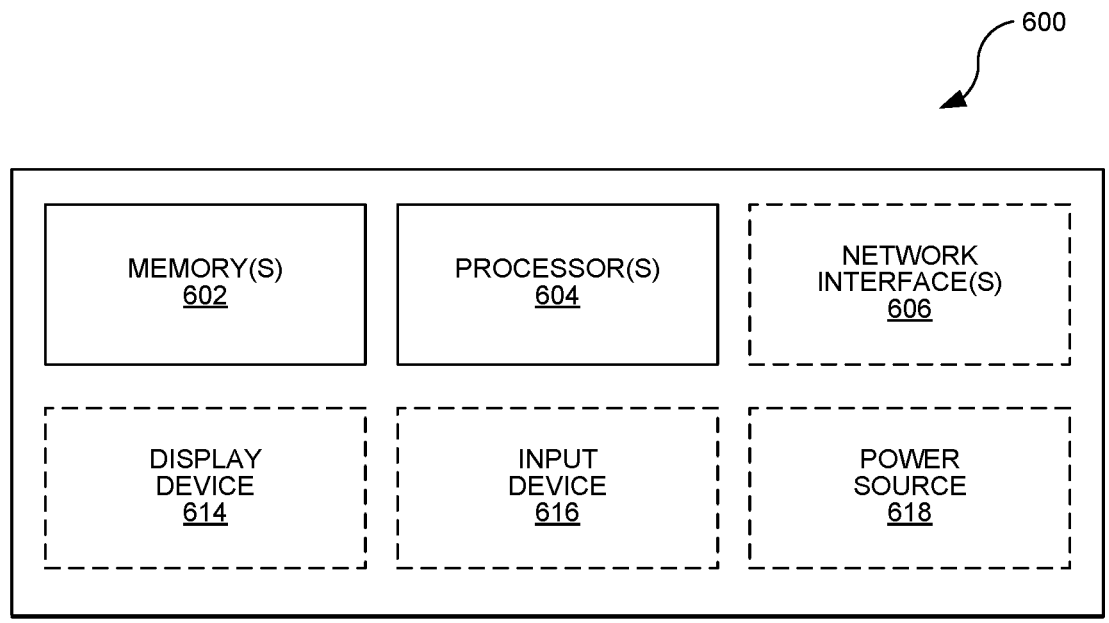
FIG. 6 is a block diagram illustrating another example computing device with which embodiments of the present disclosure may be utilized.

FIG. 6 is a block diagram illustrating another example computing device 600 with which embodiments of the present disclosure may be utilized. The example computing device 600 may be used to implement any of the global registry 108, owner 112, issuer 114, custodian 116, broker dealer 118, investor 120, one of the network nodes 140 storing a copy of the distributed ledger 122, security token exchange 124, and/or a virtual machine (e.g., Ethereum Virtual Machine) executing any of the smart contracts described herein. The computing device 600 includes at least one memory 602, at least one processor 604, optional at least one network interface 606, optional display device 608, optional input device 610, and optional power source 612.

In examples, the at least one memory 602 can be any device, mechanism, or populated data structure used for storing information. In examples, the at least one memory 602 can be or include any type of volatile memory, nonvolatile memory, and/or dynamic memory. In examples, the at least one memory 602 can be random access memory, memory storage devices, optical memory devices, magnetic media, floppy disks, magnetic tapes, hard drives, erasable programmable read-only memories (EPROMs), electrically erasable programmable read-only memories (EEPROMs), optical media (such as compact discs, DVDs, Blu-ray Discs) and/or the like.

In accordance with some embodiments, the at least one memory 602 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information, which can be used as the at least one memory 602. The at least one memory 602 may be used to store instructions for running one or more applications or modules on the at least one processor 604. In examples, the at least one memory 602 could be used in one or more examples to house all or some of the instructions needed to execute the functionality discussed herein, e.g., in FIGS. 3-4.

The at least one processor 604 can be any known processor, such as a general purpose processor (GPP) or special purpose (such as a field-programmable gate array (FPGA), application-specific integrated circuit (ASIC) or other integrated circuit or circuitry), or any programmable logic device. In examples, any of the functionality disclosed herein (e.g., in FIGS. 3-4) may be implemented by the at least one processor 604 and the at least one memory 602.

In examples, the at least one optional network interface 606 includes or is coupled to at least one optional antenna for communication with a network (such as one of the at least one networks 112 of system 100). In examples, the at least one optional network interface 606 includes at least one of an Ethernet interface, a cellular radio access technology (RAT) radio, a Wi-Fi radio, a Bluetooth radio, or a near field communication (NFC) radio. In examples, the at least one optional network interface 606 includes a cellular radio access technology radio configured to establish a cellular data connection (mobile Internet) of sufficient speeds with a remote server using a local area network (LAN) or a wide area network (WAN). In examples, the cellular radio access technology includes at least one of Personal Communication Services (PCS), Specialized Mobile Radio (SMR) services, Enhanced Special Mobile Radio (ESMR) services, Advanced Wireless Services (AWS), Code Division Multiple Access (CDMA), Global System for Mobile Communications (GSM) services, Wideband Code Division Multiple Access (W-CDMA), Universal Mobile Telecommunications System (UMTS), Worldwide Interoperability for Microwave Access (WiMAX), 3rd Generation Partnership Projects (3GPP) Long Term Evolution (LTE), High Speed Packet Access (HSPA), third generation (3G) fourth generation (4G), fifth generation (5G), etc. or other appropriate communication services or a combination thereof. In examples, the at least one optional network interface 606 includes a Wi-Fi (IEEE 802.11) radio configured to communicate with a wireless local area network that communicates with the remote server, rather than a wide area network. In examples, the at least one optional network interface 606 includes a near field radio communication device that is limited to close proximity communication, such as a passive near field communication (NFC) tag, an active near field communication (NFC) tag, a passive radio frequency identification (RFID) tag, an active radio frequency identification (RFID) tag, a proximity card, or other personal area network device.

In examples, the optional at least one display device 608 includes at least one of a light emitting diode (LED), a liquid crystal display (LCD), a light emitting diode (LED) display, an organic light emitting diode (OLED) display, an e-ink display, a field emission display (FED), a surface-conduction electron-emitter display (SED), or a plasma display. In examples, the optional at least one input device 610 includes at least one of a touchscreen (including capacitive and resistive touchscreens), a touchpad, a capacitive button, a mechanical button, a switch, a dial, a keyboard, a mouse, a camera, a biometric sensor/scanner, a microphone, etc. In examples, the optional at least one display device 608 is combined with the optional at least one input device 610 into a human machine interface (HMI) for user interaction with the computing device 600. In examples, at least one optional power source 612 is used to provide power to the various components of the computing device 600.

Terminology

Brief definitions of terms, abbreviations, and phrases used throughout this application are given below.

The term "determining" may include calculating, computing, generating, processing, deriving, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the phrase "based on" does not preclude intermediate steps, e.g., A is based on C may mean that B is based on C and A is based on B. Additionally, the term "and/or" means "and" or "or". In examples, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms are used in an operational sense and are not necessarily limited to a direct physical connection or coupling. Thus, In examples, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

The phrases "in exemplary embodiments", "in example embodiments", "in some embodiments", "according to some embodiments", "in the embodiments shown", "in other embodiments", "embodiments", "in examples", "examples", "in some examples", "some examples" and the like generally mean the particular feature, structure, or characteristic following the phrase is included in at least one embodiment of the present disclosure, and may be included in more than one embodiment of the present disclosure. In addition, such phrases do not necessarily refer to the same embodiments or different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks as one skilled in the art will appreciate. As such, the illustrated applications of the embodiments of the present disclosure are not meant to be limiting, but instead are examples. Other systems, devices, and networks to which embodiments of the present disclosure are applicable include, In examples, other types of communication and computer devices and systems. More specifically, embodiments are applicable to communication systems, services, and devices such as cell phone networks and compatible devices. In addition, embodiments are applicable to all levels of computing from the personal computer to large network mainframes and servers.

In conclusion, the present disclosure provides novel systems, methods, and arrangements for using security tokens implementing smart-contract-based compliance rules that reference a global registry of investors based on smart contracts. While detailed descriptions of one or more embodiments of the disclosure have been given above, various alternatives, modifications, and equivalents will be apparent to those skilled in the art without varying from the spirit of the disclosure. In examples, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a network node comprising: at least one processor; at least one memory communicatively coupled to the at least one processor; at least one network interface communicatively couple to the at least one processor; wherein the network node is configured to be within a plurality of network nodes communicatively coupled in a peer-to-peer network of network nodes implementing a distributed ledger; wherein the network node is configured to be communicatively coupled to at least one remotely located computing device through the at least one network interface; wherein the at least one processor is configured to: receive, from a remotely located computing device, a request to transfer a security token; execute a plurality of compliance rules associated with the security token, wherein at least one of the compliance rules is implemented using at least one smart contract, wherein the at least one smart contract references a global registry; and transfer the security token based on the execution of the compliance rules.

Example 2 includes the network node of Example 1, wherein the security token is a cryptographic token that represents an external, tradeable asset.

Example 3 includes the network node of any of Examples 1-2, wherein the global registry includes at least one personally identifiable information (PII) hash for each of at least one investor involved in the requested transfer, wherein the PII hash is committed to a distributed ledger, wherein each PII hash is updated when PII of a respective one of the multiple investors changes.

Example 4 includes the network node of any of Examples 1-3, wherein the global registry comprises at least one of the following attributes: an indication of whether at least one of the at least one investor qualifies under Securities and Exchange Commission (SEC) Regulation A; an indication of whether at least one of the at least one investor qualifies under SEC Regulation D; and an indication of whether at least one of the at least one investor qualifies under SEC Regulation S.

Example 5 includes the network node of Example 4, wherein the global registry further comprises at least one of the following attributes: an indication of whether anti-money laundering and know-your-customer (AML/KYC) checks have been performed for at least one investor associated with the security token transaction.

Example 6 includes the network node of Example 5, wherein the global registry further comprises at least one of the following attributes: an indication of whether a freeze has been placed on any of the at least one investor; an indication of whether a freeze has been placed on a security token; an indication of whether a freeze has been placed on a custodian associated with the security token transaction; and an indication of whether a freeze has been placed on any broker dealer associated with the security token transaction.

Example 7 includes the network node of Example 6, wherein a freeze is placed on or removed from any of the at least one investor by modifying attributes in an investor element in the global registry; wherein a freeze is placed on or removed from the security token by modifying attributes in a security token element in the global registry; wherein a freeze is placed on or removed from the custodian by modifying attributes in a custodian element in the global registry; and wherein a freeze is placed on or removed from any broker dealer associated with the security token transaction by modifying attributes in a broker dealer element in the global registry.

Example 8 includes the sys network node term of any of Examples 6-7, wherein the global registry comprises a data storage smart contract that stores one or more of the attributes in the global registry.

Example 9 includes the network node of any of Examples 1-8, wherein the security token stores a table that indicates a length of time a particular security token has been owned by the investor.

Example 10 includes the network node of any of Examples 1-9, wherein the security token is implemented using an originating smart contract.

Example 11 includes the network node of any of Examples 1-10, wherein a record of an issuance of the security token is recorded on the distributed ledger.

Example 12 includes the network node of any of Examples 1-11, wherein a record of the transfer is committed to the distributed ledger.

Example 13 includes a computerized method for transferring a self-enforcing security token, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising: receiving, from a remotely located computing device, a request to transfer a security token; executing a plurality of compliance rules associated with the security token, wherein at least one of the compliance rules is implemented using at least one smart contract, wherein the at least one smart contract references a global registry; and transferring the security token based on the execution of the compliance rules.

Example 14 includes the computerized method of Example 13, wherein the security token is a cryptographic token that represents an external, tradeable asset.

Example 15 includes the computerized method of any of Examples 13-14, wherein the global registry includes at least one personally identifiable information (PII) hash for each of at least one investor involved in the requested transfer, wherein the PII hash is committed to a distributed ledger, wherein each PII hash is updated when PII of a respective one of the multiple investors changes.

Example 16 includes the computerized method of any of Examples 13-15, wherein the global registry comprises at least one of the following attributes: an indication of whether at least one of the at least one investor qualifies under Securities and Exchange Commission (SEC) Regulation A; an indication of whether at least one of the at least one investor qualifies under SEC Regulation D; and an indication of whether at least one of the at least one investor qualifies under SEC Regulation S.

Example 17 includes the computerized method of Example 16, wherein the global registry further comprises at least one of the following attributes: an indication of whether anti-money laundering and know-your-customer (AML/KYC) checks have been performed for at least one investor associated with the security token transaction; and an indication of a length of time a particular security token has been owned by the investor.

Example 18 includes the computerized method of Example 17, wherein the global registry further comprises at least one of the following attributes: an indication of whether a freeze has been placed on any of the at least one investor; an indication of whether a freeze has been placed on a security token; an indication of whether a freeze has been placed on a custodian associated with the security token transaction; and an indication of whether a freeze has been placed on any broker dealer associated with the security token transaction.

Example 19 includes the computerized method of Example 18, wherein a freeze is placed on or removed from any of the at least one investor by modifying attributes in an investor element in the global registry; wherein a freeze is placed on or removed from the security token by modifying attributes in a security token element in the global registry; wherein a freeze is placed on or removed from the custodian by modifying attributes in a custodian element in the global registry; and wherein a freeze is placed on or removed from any broker dealer associated with the security token transaction by modifying attributes in a broker dealer element in the global registry.

Example 20 includes the computerized method of any of Examples 18-19, wherein the global registry comprises a data storage smart contract that stores one or more of the attributes in the global registry.

Example 21 includes the computerized method of any of Examples 13-20, wherein the security token stores a table that indicates a length of time a particular security token has been owned by the investor.

Example 22 includes the computerized method of any of Examples 13-21, wherein the security token is implemented using an originating smart contract.

Example 23 includes the computerized method of any of Examples 13-22, wherein a record of an issuance of the security token is recorded on the distributed ledger.

Example 24 includes the computerized method of any of Examples 13-23, wherein a record of the transfer is committed to the distributed ledger.

Example 25 includes a system, comprising: a plurality of network nodes communicatively coupled in a peer-to-peer network of network nodes implementing a distributed ledger, each network node comprising: at least one processor; at least one memory communicatively coupled to the at least one processor; wherein the at least one processor is configured to: receive, from a remotely located computing device, a request to transfer a smart-contract-based security token; execute a plurality of smart-contract-based compliance rules associated with the security token; and transfer the security token based on the execution of the compliance rules, wherein the transfer comprises updating a table of balances in the security token; the security token stored on the distributed ledger, wherein the security token is a cryptographic token that represents an external, tradeable asset, wherein the security token references the plurality of smart-contract-based compliance rules that are associated with the security token, and wherein at least one of the smart-contract-based compliance rules references a smart-contract-based global registry; and the smart-contract-based global registry, comprising: at least one personally identifiable information (PII) hash for each of at least one investor; indications of whether at least one of the at least one investor qualifies under Securities and Exchange Commission (SEC) Regulation A, Regulation S, and Regulation D; and an indication of whether anti-money laundering and know-your-customer (AML/KYC) checks have been performed by a broker dealer associated with the security token transaction.

Example 26 includes the system of Example 25, wherein the global registry further comprises at least one of the following attributes: an indication of whether a freeze has been placed on any of the at least one investor; an indication of whether a freeze has been placed on a security token; an indication of whether a freeze has been placed on a custodian associated with the security token transaction; and an indication of whether a freeze has been placed on any broker dealer associated with the security token transaction.

Example 27 includes the system of Example 26, wherein a freeze is placed on or removed from any of the at least one investor by modifying attributes in an investor element in the global registry; wherein a freeze is placed on or removed from the security token by modifying attributes in a security token element in the global registry; wherein a freeze is placed on or removed from the custodian by modifying attributes in a custodian element in the global registry; and wherein a freeze is placed on or removed from any broker dealer associated with the security token transaction by modifying attributes in a broker dealer element in the global registry.

Example 21 includes the system of any of Examples 25-27, wherein the security token stores a table that indicates a length of time a particular security token has been owned by a particular investor.

What is claimed is:

1. A network node comprising:
   at least one processor;
   at least one memory communicatively coupled to the at least one processor;
   at least one network interface communicatively coupled to the at least one processor;
   wherein the network node is configured to be within a plurality of network nodes communicatively coupled in a peer-to-peer network of network nodes implementing a distributed ledger;
   wherein the network node is configured to be communicatively coupled to at least one remotely located computing device through the at least one network interface;
   wherein the at least one processor is configured to:
      receive, from a remotely located computing device, a request to transfer a security token;
      execute a plurality of compliance rules associated with the security token;
      wherein at least one of the plurality of compliance rules is implemented using at least one smart contract separate from an originating smart contract that implements the security token;
      wherein the at least one smart contract is implemented on the distributed ledger and references a global registry;
      transfer the security token based on the execution of the plurality of compliance rules;
      wherein the global registry comprises at least one personally identifiable information (PIT) hash for each of at least one investor associated with the transfer of the security token, wherein the at least one PII hash for each of the at least one investor is committed to the distributed ledger, wherein each of the at least one PII hash is updated when PII of a respective one of the at least one investor changes;
      wherein the global registry further comprises at least one indication of:
         whether an offering of the security token qualifies under Securities and Exchange Commission (SEC) Regulation A;
         whether at least one of the at least one investor qualifies under SEC Regulation D;
         whether the offering of the security token qualifies under SEC Regulation S; and
         whether anti-money laundering and know-your-customer (AML/KYC) checks have been performed for the at least one investor associated with the transfer of the security token.

2. The network node of claim 1, wherein the security token is a cryptographic token that represents an external, tradeable asset.

3. The network node of claim 1, wherein the at least one indication of the global registry further comprises at least one indication of:
   whether a freeze has been placed on any of the at least one investor;
   whether a freeze has been placed on the security token;
   whether a freeze has been placed on a custodian associated with the transfer of the security token; and
   whether a freeze has been placed on any broker dealer associated with the transfer of the security token.

4. The network node of claim 3,
   wherein a freeze is placed on or removed from any of the at least one investor by modifying attributes in an investor element in the global registry;
   wherein a freeze is placed on or removed from the security token by modifying attributes in a security token element in the global registry;
   wherein a freeze is placed on or removed from the custodian by modifying attributes in a custodian element in the global registry; and
   wherein a freeze is placed on or removed from any broker dealer associated with the transfer of the security token by modifying attributes in a broker dealer element in the global registry.

5. The network node of claim 3, wherein the global registry comprises a data storage smart contract that stores the at least one indication in the global registry.

6. The network node of claim 1, wherein the security token stores a table that indicates a length of time a particular security token has been owned by a particular investor.

7. The network node of claim 1, wherein a record of an issuance of the security token is recorded on the distributed ledger.

8. The network node of claim 1, wherein a record of the transfer of the security token is committed to the distributed ledger.

9. A computerized method for transferring a self-enforcing security token, wherein the computerized method is performed by a network node configured to be included within a plurality of network nodes in a peer-to-peer network of network nodes implementing a distributed ledger, wherein the network node is configured to be communicatively coupled to other network nodes in the peer-to-peer network, the computerized method comprising:
   receiving, from a remotely located computing device, a request to transfer a security token;
   executing a plurality of compliance rules associated with the security token;
   wherein at least one of the plurality of compliance rules is implemented using at least one smart contract separate from an originating smart contract that implements the security token;
   wherein the at least one smart contract is implemented on the distributed ledger and references a global registry; and
   transferring the security token based on the execution of the plurality of compliance rules;
   wherein the global registry comprises at least one personally identifiable information (PII) hash for each of at least one investor associated with the transfer of the security token, wherein the at least one PII hash for each of the at least one investor is committed to the distributed ledger, wherein each of the at least one PII hash is updated when PII of a respective one of the at least one investor changes;
wherein the global registry further comprises at least one indication of:
   whether an offering of the security token qualifies under Securities and Exchange Commission (SEC) Regulation A;
   whether at least one of the at least one investor qualifies under SEC Regulation D;
   whether the offering of the security token qualifies under SEC Regulation S;
   whether anti-money laundering and know-your-customer (AML/KYC) checks have been performed for the at least one investor associated with the transfer of the security token; and
   a length of time a particular security token has been owned by a particular investor.

10. The computerized method of claim 9, wherein the security token is a cryptographic token that represents an external, tradeable asset.

11. The computerized method of claim 9, wherein the global registry further comprises at least one indication of:
   whether a freeze has been placed on any of the at least one investor;
   whether a freeze has been placed on the security token;
   whether a freeze has been placed on a custodian associated with the transfer of the security token; and
   whether a freeze has been placed on any broker dealer associated with the transfer of the security token.

12. The computerized method of claim 11,
   wherein a freeze is placed on or removed from any of the at least one investor by modifying attributes in an investor element in the global registry;
   wherein a freeze is placed on or removed from the security token by modifying attributes in a security token element in the global registry;
   wherein a freeze is placed on or removed from the custodian by modifying attributes in a custodian element in the global registry; and
   wherein a freeze is placed on or removed from any broker dealer associated with the transfer of the security token by modifying attributes in a broker dealer element in the global registry.

13. The computerized method of claim 11, wherein the global registry comprises a data storage smart contract that stores the at least one indication in the global registry.

14. The computerized method of claim 9, wherein a record of an issuance of the security token is recorded on the distributed ledger.

15. The computerized method of claim 9, wherein a record of the transfer of the security token is committed to the distributed ledger.

16. A system, comprising:
a plurality of network nodes communicatively coupled in a peer-to-peer network of network nodes implementing a distributed ledger, each network node comprising:
   at least one processor;
   at least one memory communicatively coupled to the at least one processor;
   wherein the at least one processor is configured to:
      receive, from a remotely located computing device, a request to transfer a smart-contract-based security token;
      execute a plurality of smart-contract-based compliance rules implemented on the distributed ledger and associated with the smart-contract-based security token, wherein the plurality of smart-contract-based compliance rules are implemented in at least one smart contract separate from an originating smart contract implementing the smart-contract-based security token; and
      transfer the smart-contract-based security token based on the execution of the plurality of smart-contract-based compliance rules, wherein the transfer comprises updating a table of balances in the smart-contract-based security token;
the smart-contract-based security token stored on the distributed ledger,
   wherein the smart-contract-based security token is a cryptographic token that represents an external, tradeable asset;
   wherein the smart-contract-based security token references the plurality of smart-contract-based compliance rules that are associated with the smart-contract-based security token; and
   wherein at least one of the plurality of smart-contract-based compliance rules references a smart-contract-based global registry; and
the smart-contract-based global registry, comprising:
   at least one personally identifiable information (PII) hash for each of at least one investor associated with the transfer of the security token, wherein the at least one PII hash for each of the at least one investor is committed to the distributed ledger, wherein each of the at least one PII hash is updated when PII of a respective one of the at least one investor changes;
   indications of whether at least one of the at least one investor qualifies under Securities and Exchange Commission (SEC) Regulation D, and whether an offering of the security token qualifies under SEC Regulation A and S; and
   an indication of whether anti-money laundering and know-your-customer (AML/KYC) checks have been performed by a broker dealer associated with the transfer of the smart-contract-based security token.

17. The system of claim 16, wherein the smart-contract-based global registry further comprises at least one indication of:
   whether a freeze has been placed on any of the at least one investor;
   whether a freeze has been placed on the smart-contract-based security token;
   whether a freeze has been placed on a custodian associated with the transfer of the smart-contract-based security token; and
   whether a freeze has been placed on any broker dealer associated with the transfer of the smart-contract-based security token.

18. The system of claim 17,
   wherein a freeze is placed on or removed from any of the at least one investor by modifying attributes in an investor element in the smart-contract-based global registry;
   wherein a freeze is placed on or removed from the smart-contract-based security token by modifying attributes in a smart-contract-based security token element in the smart-contract-based global registry;
   wherein a freeze is placed on or removed from the custodian by modifying attributes in a custodian element in the smart-contract-based global registry; and
   wherein a freeze is placed on or removed from any broker dealer associated with the transfer of the smart-contract-based security token by modifying attributes in a broker dealer element in the smart-contract-based global registry.

19. The system of claim 16, wherein the smart-contract-based security token stores a table that indicates a length of time a particular smart-contract-based security token has been owned by a particular investor.

* * * * *